US009834384B2

(12) United States Patent
Dopp et al.

(10) Patent No.: US 9,834,384 B2
(45) Date of Patent: Dec. 5, 2017

(54) GAP ADJUSTMENT ASSEMBLY FOR BLADE PORTIONER CONVEYORS

(71) Applicant: John Bean Technologies Corporation, Chicago, IL (US)

(72) Inventors: Alex Dopp, Kirkland, WA (US); Erick Sorenson, Shoreline, WA (US)

(73) Assignee: John Bean Technologies Corporation, Chicago, IL (US)

( * ) Notice: Subject to any disclaimer, the term of this patent is extended or adjusted under 35 U.S.C. 154(b) by 0 days.

(21) Appl. No.: 15/004,912

(22) Filed: Jan. 23, 2016

(65) Prior Publication Data
US 2017/0210569 A1    Jul. 27, 2017

(51) Int. Cl.
*B26D 5/22* (2006.01)
*B65G 21/14* (2006.01)
(Continued)

(52) U.S. Cl.
CPC .......... *B65G 21/14* (2013.01); *B26D 1/0006* (2013.01); *B26D 1/28* (2013.01); *B26D 5/02* (2013.01); *B26D 5/22* (2013.01); *B26D 7/2614* (2013.01); *B26D 2210/02* (2013.01); *B65G 2201/0202* (2013.01)

(58) Field of Classification Search
CPC .......... B26D 5/22; B26D 7/065; B65G 21/14
USPC .... 198/586, 594, 606, 812; 83/471.3, 477.2, 83/676, 707
See application file for complete search history.

(56) References Cited

U.S. PATENT DOCUMENTS 2,822,003 A * 2/1958 McCahon ............... B27B 25/04
                                                144/242.1
3,948,153 A * 4/1976 Dutro ................... B65H 29/001
                                                198/418.9
(Continued)

FOREIGN PATENT DOCUMENTS

EP    1 483 970 A1    12/2004
EP    2 030 744 A1    3/2009
(Continued)

OTHER PUBLICATIONS

"Multi Slicer SSN-180 Apollo," Nantsune Co., Ltd., Fujiidera-City, Japan, Feb. 2008, 2-page brochure.
(Continued)

*Primary Examiner* — Douglas Hess
(74) *Attorney, Agent, or Firm* — Christensen O'Connor Johnson Kindness PLLC

(57) ABSTRACT

An automatic blade and conveyor gap adjustment assembly for a blade portioning conveyor machine having a blade assembly and a conveyor assembly with an infeed conveyor and an outfeed conveyor includes a blade adjustment assembly suitable for moving the blade assembly between at least first and second positions relative to the conveyor assembly and a first automatic conveyor gap adjustment assembly. The first automatic conveyor gap adjustment assembly is configured to define a first gap between an interior nose of the infeed conveyor and an interior nose of the outfeed conveyor to correspond to the first position of the blade assembly, and it is configured to define a second gap between the interior nose of the infeed conveyor and the interior nose of the outfeed conveyor to correspond to the second position of the blade assembly.

25 Claims, 14 Drawing Sheets

(51) Int. Cl.
  *B26D 1/00* (2006.01)
  *B26D 1/28* (2006.01)
  *B26D 5/02* (2006.01)
  *B26D 7/26* (2006.01)

(56) References Cited

U.S. PATENT DOCUMENTS

| | | | | |
|---|---|---|---|---|
| 4,041,674 | A | * | 8/1977 | Reid ............... B65B 9/02 198/418.5 |
| 4,196,646 | A | * | 4/1980 | Mukumoto ........... B26D 7/32 53/517 |
| 4,684,008 | A | * | 8/1987 | Hayashi ............. B65G 47/71 198/431 |
| 4,793,228 | A | * | 12/1988 | Etter ............... B26D 7/32 83/155.1 |
| 5,077,901 | A | | 1/1992 | Warner et al. |
| 5,209,339 | A | * | 5/1993 | Antonissen .......... B65G 43/08 198/419.1 |
| 5,259,282 | A | * | 11/1993 | Cothrell ............ B23D 59/001 83/271 |
| 5,423,250 | A | | 6/1995 | Anderson et al. |
| 5,439,096 | A | * | 8/1995 | Shigematsu ........... A21C 9/08 198/586 |
| 5,784,936 | A | * | 7/1998 | King ............... B26D 7/32 83/145 |
| 5,784,937 | A | * | 7/1998 | Wygal ............... B26D 3/22 198/592 |
| 6,023,034 | A | * | 2/2000 | Nakajima ........... B65H 39/10 198/460.1 |
| 6,158,315 | A | * | 12/2000 | Nowotny ............. A21C 3/06 83/102 |
| 6,508,153 | B1 | * | 1/2003 | Lumberg ............ B65G 47/52 83/318 |
| 6,763,750 | B2 | * | 7/2004 | Lindee ............. B26D 7/32 198/468.11 |
| 6,935,215 | B2 | * | 8/2005 | Lindee ............ B26D 7/0683 83/155 |
| 7,402,130 | B1 | * | 7/2008 | Sjostedt ............ B65H 31/10 270/39.01 |
| 7,451,675 | B1 | * | 11/2008 | Johnson ............. B26D 1/02 83/102.1 |
| 7,546,789 | B2 | | 6/2009 | Reddell et al. |
| 7,698,977 | B2 | * | 4/2010 | Culling ............ B26D 7/32 83/155 |
| 8,167,136 | B2 | * | 5/2012 | Betti ............... B26D 7/18 198/588 |
| 8,997,614 | B2 | | 4/2015 | Baechtle et al. |
| 9,008,824 | B1 | | 4/2015 | Blaine et al. |
| 9,290,324 | B2 | * | 3/2016 | Haas ............... A21C 9/08 |
| 2004/0031363 | A1 | | 2/2004 | Lindee et al. |
| 2005/0000344 | A1 | | 1/2005 | Bucks |
| 2006/0154587 | A1 | | 7/2006 | Mikkelsen et al. |
| 2007/0028742 | A1 | | 2/2007 | Mueller et al. |
| 2008/0047407 | A1 | | 2/2008 | Muller |
| 2013/0068076 | A1 | | 3/2013 | Schmeiser et al. |
| 2014/0360333 | A1 | | 12/2014 | Sprow et al. |
| 2015/0246458 | A1 | | 9/2015 | Gahler et al. |

FOREIGN PATENT DOCUMENTS

| | | |
|---|---|---|
| EP | 2 572 840 A2 | 3/2013 |
| EP | 2 759 205 A1 | 7/2014 |
| EP | 2 878 203 A1 | 6/2015 |
| EP | 2 759 205 B1 | 7/2015 |
| EP | 2 628 392 B1 | 10/2015 |
| GB | 2 173 008 A | 10/1986 |
| GB | 2 239 787 A | 7/1991 |
| GB | 2 331 917 A | 6/1999 |
| GB | 2 377 362 A | 1/2003 |
| GB | 2 409 801 A | 7/2005 |
| GB | 2482429 A | 1/2011 |
| JP | 2009095897 A | 5/2009 |
| WO | 94/26479 A1 | 11/1994 |
| WO | 2016/083621 A1 | 6/2016 |

OTHER PUBLICATIONS

"GEA GigaSlicer," GEA Mechanical Equipment, Mar. 26, 2015, 4-page brochure.
"Slicing Performance CFS GigaSlicer," © 2012 GEA Food Solutions, GEA CFS Buehl GmbH, Kempten, Germany, 4-page brochure.
International Search Report and Written Opinion dated May 9, 2017, issued in corresponding International Application No. PCT/US2017/014602, filed Jan. 23, 2017, 12 pages.
International Search Report and Written Opinion dated May 10, 2017, issued in corresponding International Application No. PCT/US2017/014604, filed Jan. 23, 2017, 10 pages.
International Search Report and Written Opinion dated May 11, 2017, issued in corresponding International Application No. PCT/US2017/014512, filed Jan. 23, 2017, 12 pages.
International Search Report and Written Opinion dated May 9, 2017, issued in corresponding International Application No. PCT/US2017/014601, filed Jan. 23, 2017, 14 pages.

* cited by examiner

GAP ADJUSTMENT ASSEMBLY FOR BLADE PORTIONER CONVEYORS

BACKGROUND

Workpieces, including food products, are portioned or otherwise cut into smaller pieces by processors in accordance with customer needs. It is usually highly desirable to portion and trim the workpieces into uniform sizes, for example, for steaks to be served at restaurants or chicken fillets used in frozen dinners or in chicken burgers. Much of the portioning of workpieces, in particular food products is now carried out with the use of high-speed portioning machines. These machines often use various scanning techniques to ascertain the size and shape of the food product as it is being advanced on a moving conveyor. This information is analyzed with the aid of a computer to determine how to most efficiently portion the food product into optimum sizes. For example, a customer may desire chicken breast portions in two different weight sizes. The chicken breast is scanned as it moves on an infeed conveyor belt and a determination is made through the use of a computer as to how best to portion the chicken breast to the weights desired by the customer, so as to use the chicken breast most effectively.

One example of a high-speed portioning machine uses rotary or reciprocating blades to portion horizontal workpieces as they move along a conveyor assembly. More specifically, the portioning machine includes an infeed conveyor that transitions into an outfeed conveyor along the same longitudinal conveyor line. A transverse gap is defined between the interior infeed conveyor belt nose and the interior outfeed conveyor belt nose that is sized to allow a rotary blade to pass thereto. As the horizontal workpiece moves from the infeed conveyor to the outfeed conveyor, the rotary blade passes through the gap at a high speed to cut the workpiece.

The blade can be adjusted so that it passes vertically through the horizontal workpiece, or it can be angled to where it passes through the workpiece at a substantial angle, for example, at forty-five degrees (45°) relative to the horizontal conveyor belts. In each instance, it is desirable to keep the gap small so that the workpiece is well supported by the conveyors as the blade passes therethrough. More specifically, when the blade is passing vertically through the workpiece, it is desirable to have the interior outfeed conveyor belt nose level with or slightly lower than the interior infeed conveyor belt nose. When the blade is passing through the workpiece at an angle, the gap can be minimized by dropping the interior outfeed conveyor belt nose lower than the interior infeed conveyor belt nose while also moving the interior outfeed conveyor belt nose longitudinally (e.g., horizontally) toward the interior infeed conveyor belt nose. In both instances, the blade is substantially tangent to the infeed and outfeed conveyor belts defining the gap.

To date, adjustment of the conveyor belt positions and the blade angle has been done manually and in series. As can be appreciated, numerous attempts are typically required to accurately set the infeed to outfeed conveyor belt gap to match the blade position. Moreover, an operator must lock and tag all power sources of the machine, remove equipment guarding, and then try to adjust and properly position the belts in an area that is wet, messy and difficult to access and see. The operator may not know if the belt is in the proper position until he re-assembles the machine, re-applies power, and runs several pieces to check the accuracy of his adjustment. If it is incorrect, he must repeat the process until it is correct. This is all done in a typically cold, hygiene-conscious food processing environment. Even in an ideal environment, the infeed to outfeed conveyor belt gap adjustment process is unreliable and prone to human error. If the belts are not properly positioned relative to one another, the blade could hit one of the belts, causing damage to the machine, or the workpiece may not be properly portioned or otherwise damaged. This conveyor belt gap adjustment process is also time consuming and therefore increases the downtime of the machine. With typical machines operating at two to three hundred finished pieces per minute or higher, even minutes of downtime leads to significant loss of revenue.

These issues are sought to be addressed by the automatic blade and conveyor gap adjustment assemblies discussed below.

SUMMARY

An automatic blade and conveyor gap adjustment assembly for a blade portioning conveyor machine having a blade assembly and a conveyor assembly with an infeed conveyor and an outfeed conveyor includes a blade adjustment assembly suitable for moving the blade assembly between at least first and second positions relative to the conveyor assembly and a first automatic conveyor gap adjustment assembly. The first automatic conveyor gap adjustment assembly is configured to define a first gap between an interior nose of the infeed conveyor and an interior nose of the outfeed conveyor to correspond to the first position of the blade assembly, and it is configured to define a second gap between the interior nose of the infeed conveyor and the interior nose of the outfeed conveyor to correspond to the second position of the blade assembly.

In another embodiment, a blade portioning conveyor machine includes a substantially horizontal conveyor assembly having an infeed conveyor with an interior nose and an outfeed conveyor with an interior nose. The blade portioning conveyor machine also includes a blade portioner assembly having a blade assembly, a blade adjustment assembly suitable for rotating the blade assembly about a substantially horizontal axis between at least first and second positions relative to the substantially horizontal conveyor assembly, and a first automatic conveyor gap adjustment assembly. The first automatic conveyor gap adjustment assembly is configured to define a first gap between the interior nose of the infeed conveyor and the interior nose of the outfeed conveyor to correspond to the first position of the blade assembly and configured to define a second gap between the interior nose of the infeed conveyor and the interior nose of the outfeed conveyor to correspond to the second position of the blade assembly.

A method for automatically adjusting a blade assembly and a conveyor gap of a conveyor assembly having an infeed conveyor and an outfeed conveyor and a first gap defined between an interior nose of the infeed conveyor and an interior nose of the outfeed conveyor includes moving the blade assembly from a first position to a second position relative to the conveyor assembly, and using a first automatic conveyor gap adjustment assembly to move one of the interior nose of the infeed conveyor and the interior nose of the outfeed conveyor relative to the other of the interior nose of the infeed conveyor, and the interior nose of the outfeed conveyor to define a second gap between the interior nose of the infeed conveyor and the interior nose of the outfeed conveyor to correspond to the second position of the blade assembly.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known structures or process steps have not been described in detail in order not to unnecessarily obscure various aspects of the present disclosure. Further, it will be appreciated that embodiments of the present disclosure may employ any combination of features described herein.

The present application includes references to directions, such as "forward," "rearward," "upward," "downward," "vertical," and "horizontal." These references and other similar references in the present application are only to assist in helping describe and understand the present invention and are not intended to limit the present invention to these directions. Also, references to "workpiece," "workpiece," "food product," "food piece," "portion", or similar are understood to be interchangeable and are not meant to be limiting in nature.

Figure 1:
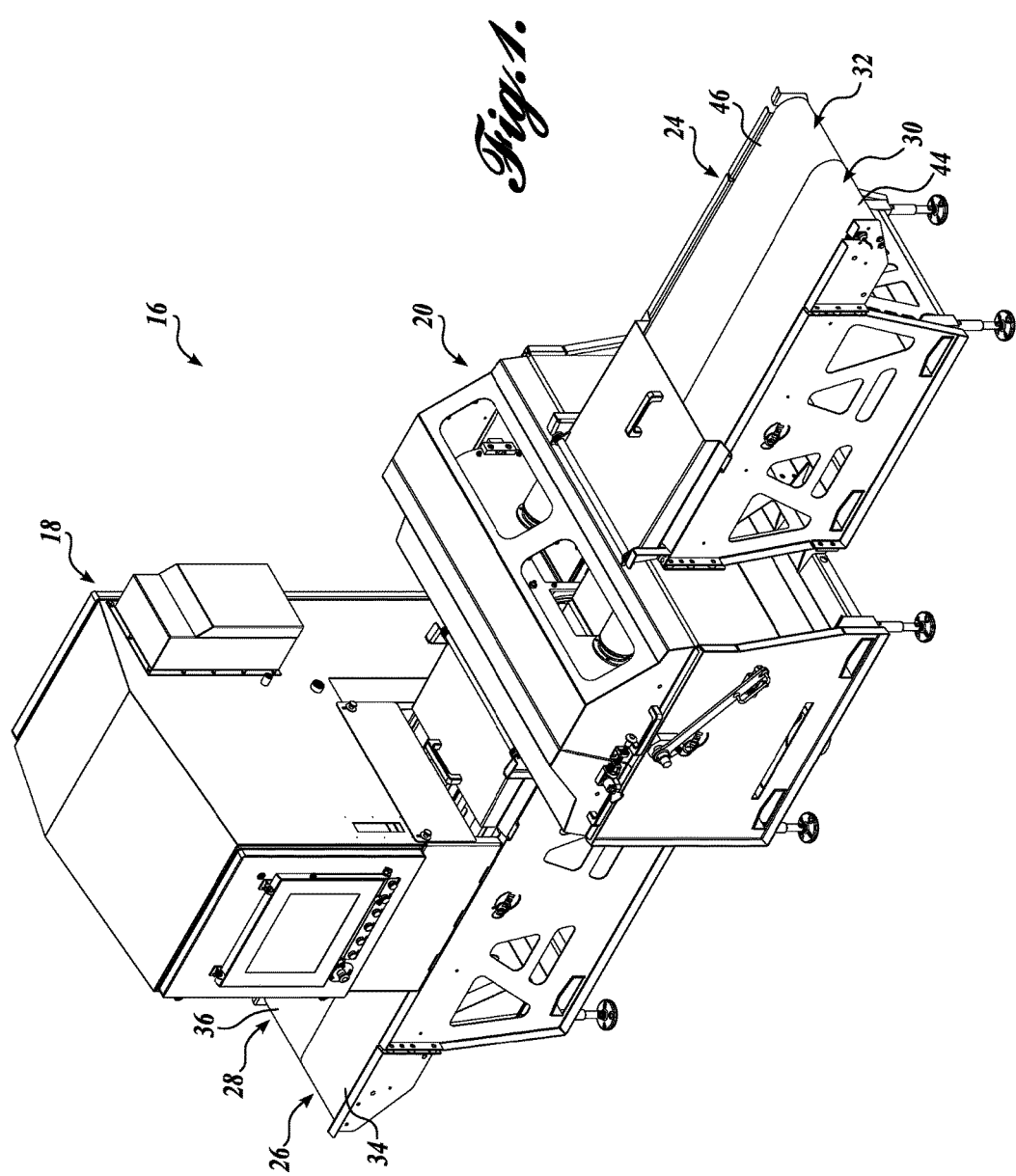
FIG. 1 is an environmental view of a blade portioning conveyor machine having a blade portioner assembly formed in accordance with an exemplary embodiment of the present disclosure.

FIG. 1 depicts a blade portioning conveyor machine 16 configured to scan, convey, and portion workpieces. In that regard, the blade portioning conveyor machine 16 includes a scanning and control assembly 18, a blade portioner assembly 20, and a conveyor assembly 24. The scanning and control assembly 18 includes a scanner (not visible in FIG. 1) for scanning the workpieces to be portioned, providing data to determine the position of the workpieces on the conveyor assembly 24, and determining the physical characteristics of the workpieces, including, for example, shape, thickness, width, volume, length, position on the conveyor belt, etc. The scanning and control assembly 18 further includes a processor for processing the data from the scanner to physically characterize the workpieces (shape, width, thickness, length, weight, weight distribution, etc.) and to determine where to make the cuts on the workpieces to achieve the desired size(s)/weight(s) for the portioned pieces. A controller (which can be part of the processor) is provided for controlling the operation of the blade portioner assembly 20 to cut the workpieces into pieces of desired sizes and/or weights.

Figure 2:
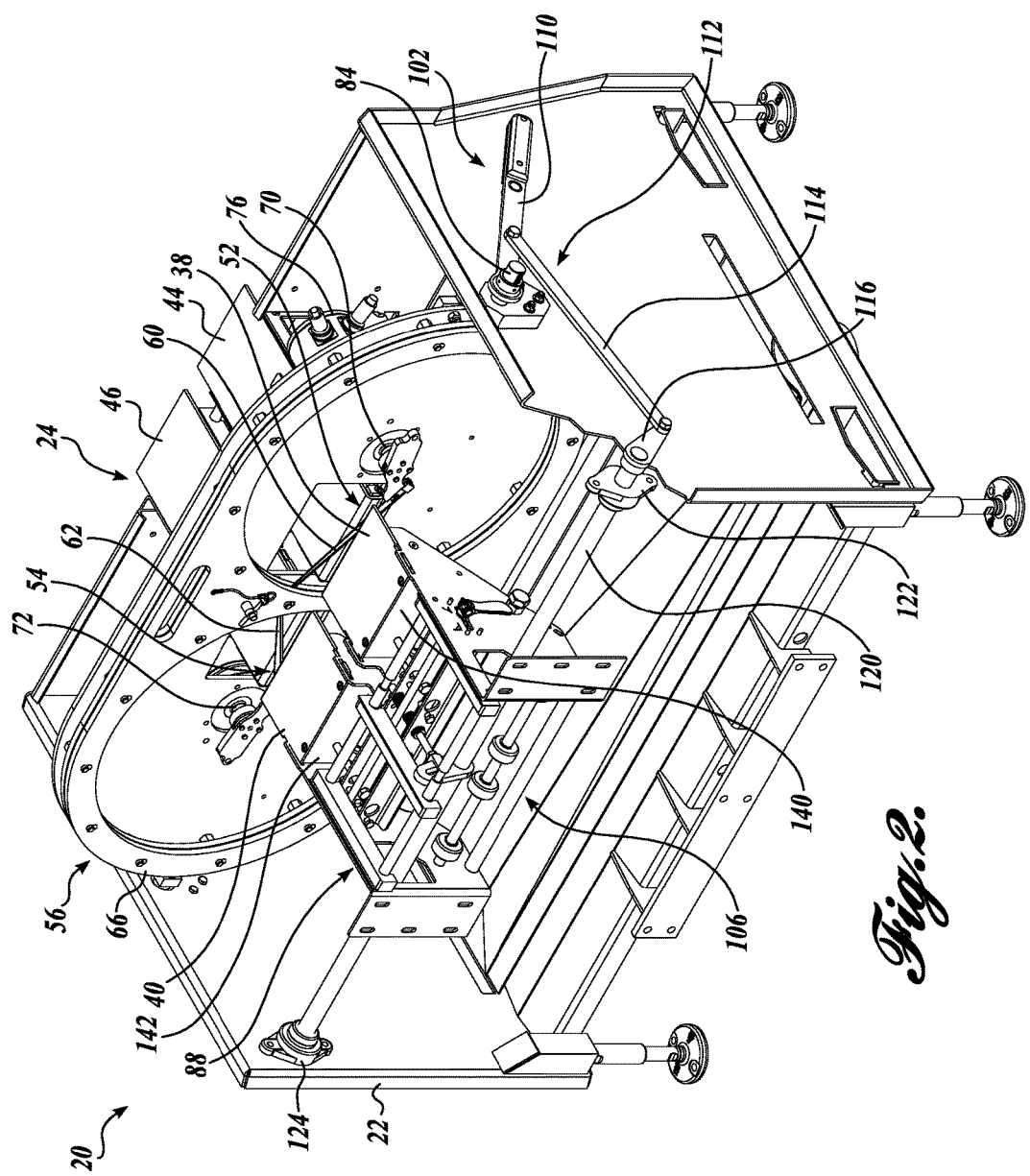
FIG. 2 is an isometric, partially cut-away view of the blade portioner assembly of FIG. 1, wherein the first and second infeed conveyor belts have been removed for clarity, and wherein the blade portioner assembly is shown in a first position.
Figure 3:
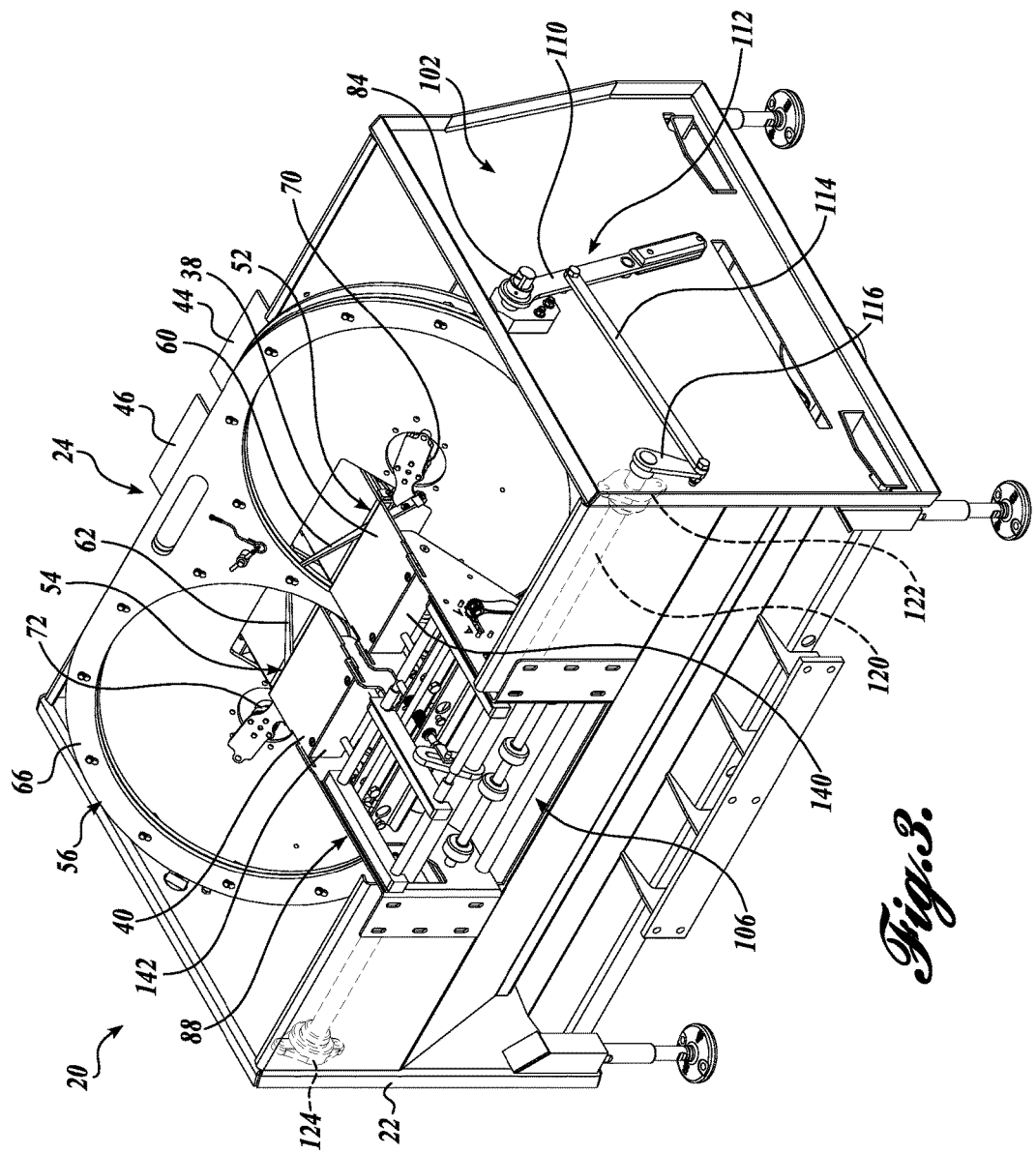
FIG. 3 is an isometric view of the blade portioner assembly of FIG. 1, wherein the first and second infeed conveyor belts have been removed for clarity, and wherein the blade portioner assembly is shown in a second position.

Referring additionally to FIGS. 2-3, the conveyor assembly 24 may be any suitable single or dual lane endless conveyor belt assembly suitable for conveying workpieces to be portioned. In the depicted embodiment, the conveyor assembly 24 generally includes first and second side-by-side infeed conveyor assemblies 26 and 28 for conveying workpieces to be portioned in two side-by-side lanes. The workpieces are conveyed toward first and second side-by-side outfeed conveyor assemblies 30 and 32, respectively, and mechanical cutters of the blade portioner assembly 20 portions the workpieces as they pass from the infeed to outfeed conveyor assemblies.

The first and second infeed conveyors 26 and 28 include first and second substantially horizontal endless infeed conveyor belts 34 and 36 that are supported for movement by a suitable infeed conveyor support structure and rollers (not labeled) with first and second infeed nose bars 38 and 40 at their respective ends. Likewise, the first and second outfeed conveyors 30 and 32 include first and second substantially horizontal endless outfeed conveyor belts 44 and 46 that are supported for movement by a suitable outfeed conveyor support structure and rollers (not labeled) with first and second outfeed nose bars (only a first outfeed nose bar 48 shown in FIGS. 10 and 11 for clarity) at their respective interior ends. First and second adjustable conveyor belt gaps 52 and 54 are defined between the interior noses of the respective first and second infeed and outfeed conveyor belts. The conveyor belt gaps 52 and 54 are sized to allow mechanical cutters, such as rotary blades or knives, to pass therethrough either vertically or at an angle relative to the substantially horizontal conveyor belts.

The blade portioner assembly 20 includes a machine housing 22 that at least partially encloses and provides support for the conveyor assembly 24, as well as a rotary blade assembly 56 and an automatic blade and conveyor gap adjustment assembly 88. The rotary blade assembly 56 includes first and second rotary blades 60 and 62 moveable within a blade housing 66. The first and second rotary blades 60 and 62 are rotatable about first and second blade axes 70 and 72 by first and second blade motors 76 and 78 or other suitable movement devices.

The blade housing 66 is mounted to a substantially horizontal drive shaft 84 for movement about the axis of the drive shaft 84 to selectively position the rotary blades 60 and 62 to pass through the first and second adjustable conveyor belt gaps 52 and 54 at a selected angle relative to the substantially horizontal conveyor belts. The drive shaft 84 extends between bearing supports (not labeled) or other suitable structure in the machine housing 22. The drive shaft 84 is positioned substantially transversely to the belts of the conveyor assembly 24 and in substantial alignment with the first and second adjustable conveyor belt gaps 52 and 54. The drive shaft 84 is moveable by a portion of the automatic blade and conveyor gap adjustment assembly 88 to move the blade housing 66 (and therefore the blades 60 and 62) into the proper position relative to the conveyor assembly 24. In particular, the blade housing 66 may be moved about the substantially horizontal axis of the drive shaft 84 to move the blade housing 66 between about ninety degrees (90°), as shown in FIGS. 2, and 6, and about forty-five degrees (45°), as shown in FIGS. 3 and 7, relative to the substantially horizontal conveyor belts of the conveyor assembly 24.

Figure 6:
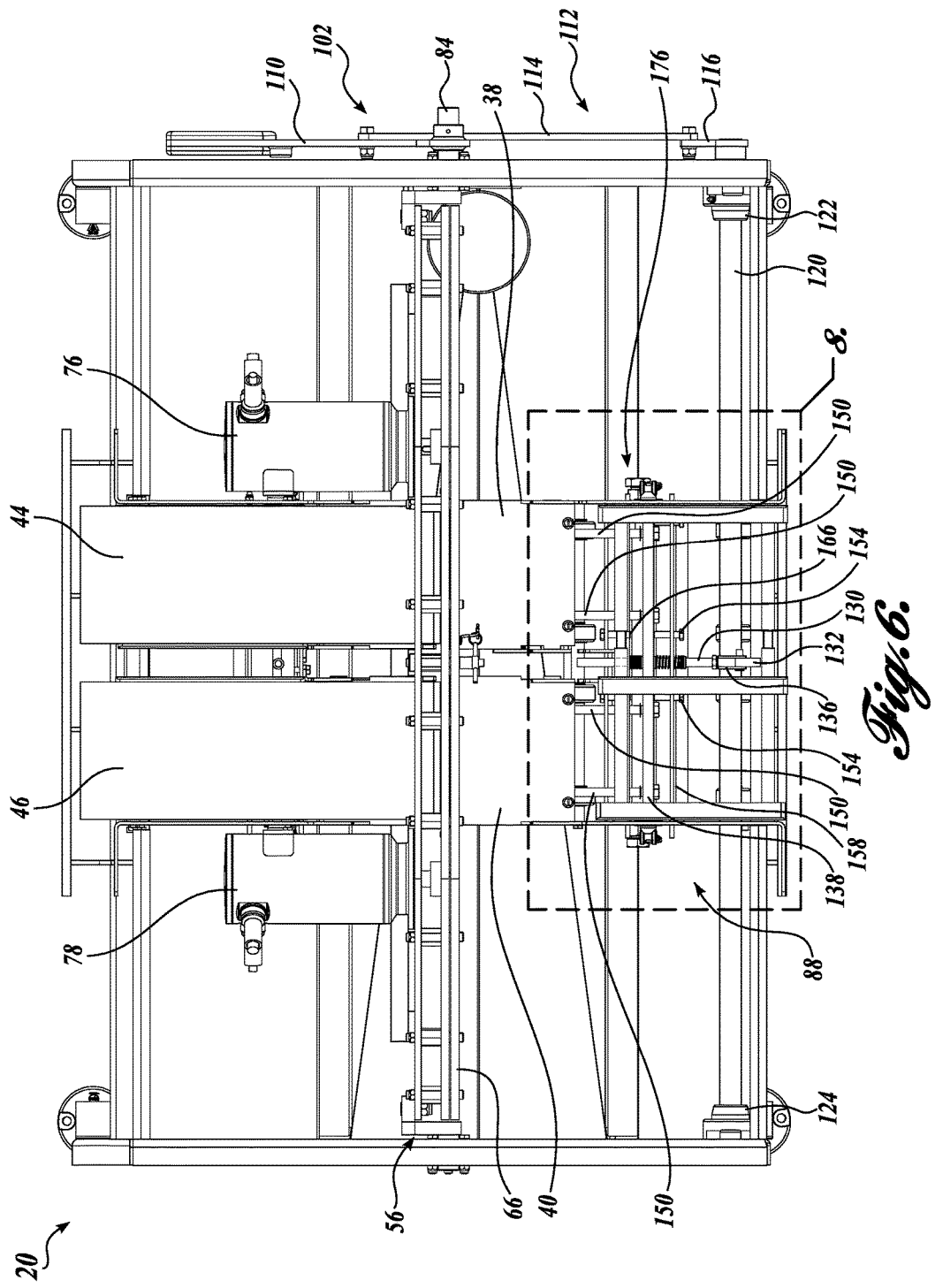
FIG. 6 is top view of the blade portioner assembly of FIG. 2.
Figure 7:
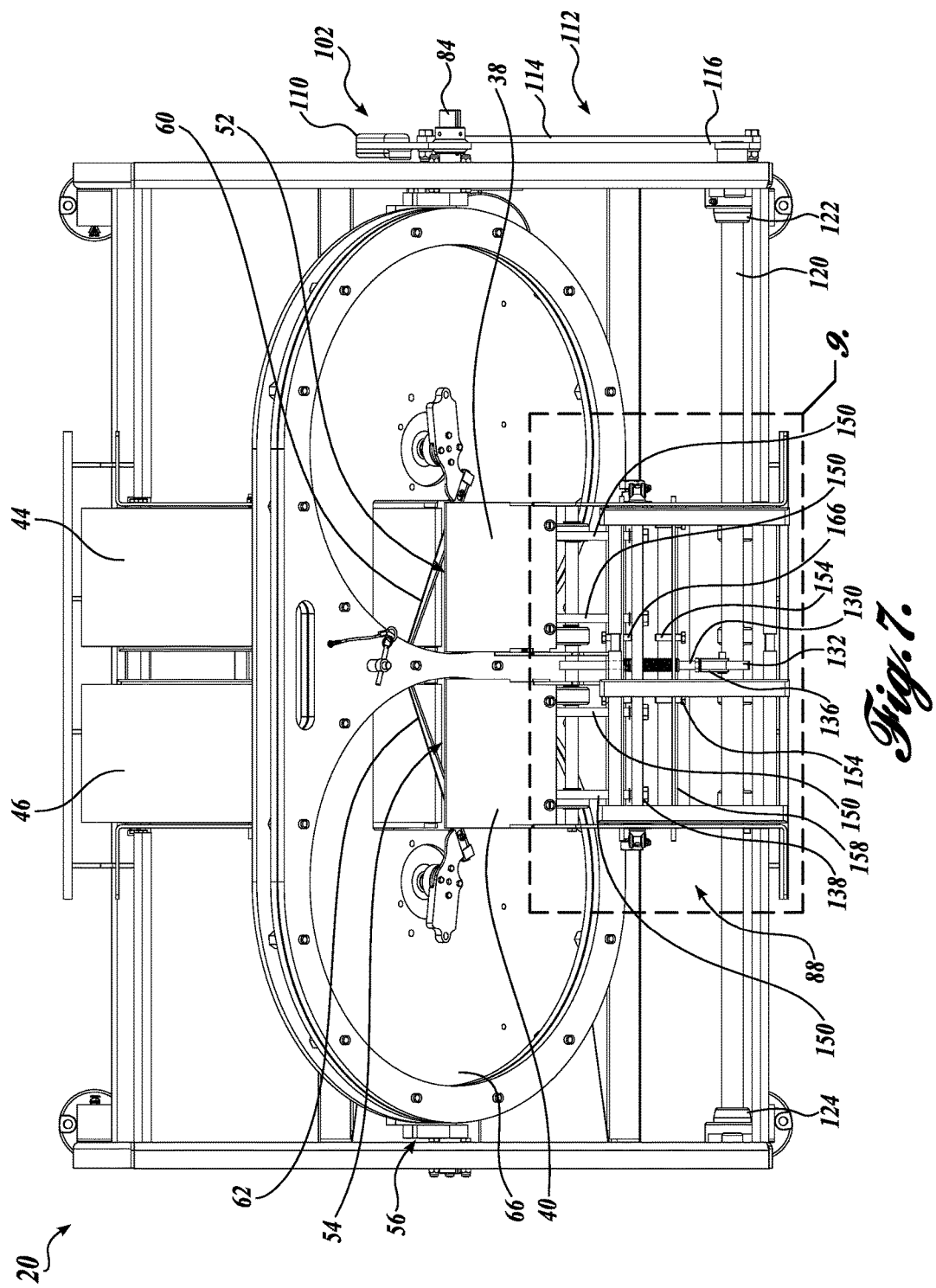
FIG. 7 is top view of the blade portioner assembly of FIG. 3.

Although the blade assembly 56 is described and illustrated as being used in first and second positions (with the blade housing 84 at about ninety degrees (90°) in the first position, as shown in FIGS. 2 and 6, and at about forty-five degrees (45°) in the second position, as shown in FIGS. 3 and 7), it should be appreciated that the disclosed embodiments may instead be configured to position the blade assembly 56 at any other desired angle relative to the substantially horizontal conveyor belts. Moreover, it should be appreciated that any other suitable conveyor assembly 24 and rotary blade assembly 56 well known to those skilled in the art may be used. For instance, the rotary blade assembly 56 may instead be configured to position each of the first and second rotary blades 60 and 62 at different angles relative to the substantially horizontal conveyor belts. Moreover, the entire rotary blade assembly 56 may instead be replaced by a water jet cutter or another suitable mechanical cutter device.

Referring to FIGS. 2-11, an exemplary embodiment of the automatic blade and conveyor gap adjustment assembly 88 suitable for automatically adjusting the size and/or position of the conveyor belt gaps 52 and 54 relative to the angle of the blade assembly 56 will now be described in detail. Referring specifically to FIGS. 2 and 3, the automatic blade and conveyor gap adjustment assembly 88 includes a blade adjustment subassembly 102 suitable for adjusting the angle of the blade assembly 56 and a first, infeed automatic conveyor gap adjustment subassembly 106 suitable for adjusting the size and/or position of the first and second conveyor belt gaps to match the angle of the blade assembly 56.

The blade adjustment subassembly 102 includes a handle 110 fixedly extending from the drive shaft 84 that is configured to turn the drive shaft 84 about its axis for rotating the blade assembly 56. Any suitable handle structure may be used to apply sufficient torque to the drive shaft 84 for rotating the blade housing 66 between a first, 90° position and a second, 45° degree position relative to the substantially horizontal belts of the conveyor assembly 24. In that regard, the first, infeed automatic conveyor gap adjustment subassembly 106 includes structure for stopping the rotation of the drive shaft 84 at the first, 90° position and the second, 45° degree position, as will be described below. Additional stops or other structure may be included to limit the movement of the handle 110, the drive shaft 84, the blade housing 66, etc., between the first and second positions in addition to the structure of the first, infeed automatic conveyor gap adjustment subassembly 106 described below. Moreover, although a handle is depicted, it should be appreciated that other suitable mechanical, electrical, or electromechanical means may instead be used to apply a torque to the drive shaft 84. For instance, the drive shaft 84 may be rotated by an actuator, motor, etc., as an alternative to the manual movement of the handle 110.

The first, infeed automatic conveyor gap adjustment subassembly 106 is operably coupled to the handle 110 through a suitable mechanical connection assembly, such as a linkage assembly 112. The linkage assembly 112 includes a connection link arm 114 that is pivotally secured between the handle 110 and a driven shaft link arm 116. The driven shaft link arm 116 is fixedly secured to an end of a driven shaft 120 extending between opposite portions of the machine housing 22 in a substantially parallel relationship to the drive shaft 84. The driven shaft 120 may be journaled for rotation within first and second bearing supports 122 and 124 or other suitable structure secured to an interior portion of the machine housing 22.

The link arms 114 and 116 translate the rotation of the handle 110 to the driven shaft 120. More specifically, when the handle 110 rotates counterclockwise to move the blade assembly 56 into the first, 90° position, the handle 110 moves the link arms 114 and 116 to rotate the driven shaft 120 counterclockwise. Similarly, when the handle 110 rotates clockwise to move the blade assembly 56 into the second, 45° position, the handle 110 moves the link arms 114 and 116 to rotate the driven shaft 120 clockwise. Accordingly, the handle 110 simultaneously rotates the drive shaft 84 of the blade adjustment subassembly 102 and the driven shaft 120 of the first, infeed automatic conveyor gap adjustment subassembly 106 to adjust the size and/or position of the conveyor belt gaps 52 and 54 according to the blade assembly position.

Any other suitable configuration may instead be used to translate the rotation of the handle 110 to the driven shaft 120, such as the configurations shown and described below with reference to FIGS. 12-13. Moreover, it should be appreciated that in alternative configurations, the driven shaft 120 need not be mechanically driven by the drive shaft 84 through a linkage or other assembly, and the driven shaft 120 may instead include a separate handle or other actuation device.

Referring specifically to FIGS. 4-11, the first, infeed automatic conveyor gap adjustment subassembly 106 includes a mechanical movement assembly that is suitable for converting the rotation of the driven shaft 120 into linear movement of the first and second infeed nose bars 38 and 40 for adjusting the first and second conveyor belt gaps 52 and 54. In the depicted embodiment, the mechanical movement assembly includes a cam assembly 128 that is configured to translate the rotation of the driven shaft 120 into linear movement of a push-pull rod 130 along a path substantially parallel to the longitudinal axes of the infeed and outfeed conveyor belts.

The cam assembly 128 may include any suitable structure for converting the rotational movement in the aforementioned manner; however, in the depicted embodiment, the cam assembly 128 includes a cam 132 that is rigidly connected to the driven shaft 120 for rotation therewith. A longitudinal slot 134 extends along a length of the cam 132 substantially transversely to the longitudinal axis of the driven shaft 120. Moveably received within the longitudinal slot 134 is a cam follower or clevis 136, which follows the path defined by the slot 134 as the cam 130 is rotated by the driven shaft 120.

A first end of the push-pull rod 130 is rigidly secured to the clevis 136 and extends substantially transversely to the driven shaft 120 and substantially parallel to the longitudinal axes of the infeed and outfeed conveyor belts. As the cam 132 rotates about the axis of the driven shaft 120, the clevis 136 follows the path of the longitudinal slot 132 to convert the rotational movement of the cam 132 into linear movement of the push-pull rod 130.

The mechanical movement assembly may instead include any other mechanism suitable for moving the push-pull rod 130 in the above manner, such as, for example, the embodiment described below with reference to FIG. 14. Moreover, the mechanical connection assembly (which can be, for example, the linkage assembly 112), and the mechanical movement assembly (which can be, for example, the cam assembly 128) may be cooperatively referred to as a mechanical connection and movement assembly.

A substantially transverse sliding bar 138 is connected to a second end of the push-pull rod 130 for movement with the push-pull rod 130. The sliding bar 138 is configured to translate the linear movement of the push-pull rod 130 to the first and second interior infeed nose bars 38 and 40 for adjusting the first and second conveyor belt gaps 52 and 54. More specifically, a plurality of infeed nose bar rods 150 extend between the sliding bar 138 and substantially transverse first and second nose bar plates 140 and 142, which are secured to or otherwise formed with the first and second infeed nose bars 38 and 40. As the sliding bar 138 is moved along the linear path of the push-pull rod 130, the first and second interior infeed nose bars 38 and 40 move toward or away from the first and second interior outfeed nose bars, thereby decreasing or increasing the first and second conveyor belt gaps 52 and 54. It should be appreciated that the sliding bar 138 may instead be coupled to the first and second infeed nose bars 38 and 40 through any other suitable structure.

The first, infeed automatic conveyor gap adjustment subassembly 106 includes an adjustable limiting assembly configured to limit the forward and rearward linear movement of the sliding bar 138 (and therefore the movement of the first and second infeed nose bars 38 and 40) to limit the widening or narrowing of the first and second conveyor belt gaps 52 and 54. As discussed above, the gaps 52 and 54 must be set at a fixed, predetermined width to match the position of the blade assembly 56 in the first, 90° position or the second, 45° degree position. The adjustable limiting assembly of the first, infeed automatic conveyor gap adjustment subassembly 106 stops the rearward linear movement of the nose bars 38 and 40 in a first position to set the first and second conveyor belt gaps 52 and 54 at a first width when the blade assembly 56 is in the first, 90° position, and the adjustable limiting assembly stops the forward linear movement of the nose bars 38 and 40 in a second position to set the first and second conveyor belt gaps 52 and 54 at a second width when the blade assembly 56 is in the second, 45° position, respectively.

Referring to FIGS. 2, 4, 8, and 10, the adjustable limiting assembly of the first, infeed automatic conveyor gap adjustment subassembly 106 will first be described as setting the first and second conveyor belt gaps 52 and 54 at a first width when the blade assembly 56 is moved into the first, 90° position. The blade assembly 56 is moved into the first, 90° position, as shown in FIG. 2, by moving the handle 110 to rotate the drive shaft 84 counterclockwise. At the same time, the drive shaft 84 transmits torque to the driven shaft 120 through the linkage assembly 112 to rotate the driven shaft 120 counterclockwise. The driven shaft 120 moves the cam 132, which effectuates linear movement of the push-pull rod 130 (and therefore the sliding bar 138) rearward and away from the outfeed conveyors 30 and 32.

The adjustable limiting assembly of the first, infeed automatic conveyor gap adjustment subassembly 106 includes suitable structure or means to limit the rearward movement of the sliding bar 138 (and therefore the first and second infeed nose bars 38 and 40) to set the infeed conveyors 26 and 28 in the first position. As can be appreciated, the first and second conveyor belt gaps 52 and 54 must only be decreased a certain amount to accommodate the first, 90° position of the blade assembly 56. If the gaps are decreased more than needed, the blades 60 and 62 could strike the conveyor belts or other portioning problems can occur. In this first position, the infeed conveyors 26 and 28 define predetermined first and second conveyor belt gaps 52 and 54 to match the position of the blade assembly 56 in the first, 90° position.

To set the infeed conveyors 26 and 28 in the first position, the adjustable limiting assembly includes a first gap-adjusting assembly 152 configured to stop the rearward movement of the infeed conveyors 26 and 28 when they have reached the first position. In particular, the first gap-adjusting assembly 152 includes structure to stop the rearward movement of the sliding bar 138 (and therefore the first and second infeed nose bars 38 and 40) when the infeed conveyors 26 and 28 have reached the first position.

In the depicted embodiment, the first gap-adjusting assembly 152 includes at least one adjustable rearward-limiting stop, such as a rearward-limiting fastener 154 positioned to engage and stop the rearward movement of the sliding bar 138 as it is moved by the push-pull rod 130 away from the outfeed conveyors 30 and 32. The rearward-limiting fasteners 154, which may be screws, bolts, etc., are threadably secured within a first transverse frame member 158 or other suitable structure. The first transverse frame member 158 is positioned between the sliding bar 138 and the driven shaft 120, and a portion of each rearward-limiting fastener 154, such as the threaded body of the fastener, extends from the first transverse frame member 158 toward the sliding bar 138 with the fastener axes substantially parallel to the longitudinal axis of the push-pull rod 130.

Each rearward-limiting fastener 154 is threaded within an opening in the transverse frame member 158 until a selected length of the threaded body of the fastener 154 extends from the first transverse frame member 158 so as to engage and stop the rearward movement of the sliding bar 138 (and therefore the first and second infeed nose bars 38 and 40) in the first position. When the first and second infeed nose bars 38 and 40 are in the first position, the first and second conveyor belt gaps 52 and 54 are also of a first size suitable to accommodate the blade assembly 56 in the first, 90° position.

The extended position of the rearward-limiting fasteners 154 may be adjusted as needed to increase or decrease the size of the first and second conveyor belt gaps 52 and 54 in the first position. As noted above, the gaps must be precisely sized to accommodate the angle of the blade assembly 56. Thus, prior to full production use of the blade portioner assembly 20, the position of each of the rearward-limiting fasteners 154 may be calibrated or fine-tuned with the blade assembly 56 in the first, 90° position to ensure that the first and second conveyor belt gaps 52 and 54 are appropriately sized. Accordingly, once the position of the rearward-limiting fasteners 154 is fixed, the first gap-adjusting assembly 152 will automatically increase the first and second conveyor belt gaps 52 and 54 to the first size when the blade assembly 56 is moved into the first, 90° position. Thus, the downtime required by an operator to change the size of the conveyor belt gaps 52 and 54 when the blade assembly is moved into the first, 90° position, along with any potential for human error is eliminated.

Referring to FIGS. 3, 5, 9, and 11, the adjustable limiting assembly of the first, infeed automatic conveyor gap adjustment subassembly 106 will now be described as setting the first and second conveyor belt gaps 52 and 54 at a second width when the blade assembly 56 is moved into the second, 45° position. The blade assembly 56 is moved into the second, 45° position, as shown in FIG. 3, by moving the handle 110 to rotate the drive shaft 84 clockwise. At the same time, the drive shaft 84 transmits torque to the driven shaft 120 through the linkage assembly 112 to rotate the driven shaft 120 clockwise. The driven shaft 120 moves the cam 132, which effectuates linear movement of the push-pull rod 130 (and therefore the sliding bar 138) forward or toward the outfeed conveyors 30 and 32.

The adjustable limiting assembly of the first, infeed automatic conveyor gap adjustment subassembly 106 includes suitable structure or means to limit the forward movement of the sliding bar 138 (and therefore the first and second infeed nose bars 38 and 40) to set the infeed conveyors 26 and 28 in the second position. As can be appreciated, the first and second conveyor belt gaps 52 and 54 must only be decreased a certain amount to accommodate the second, 45° position of the blade assembly 56. If the gaps are decreased more than needed, the blades 60 and 62 may not cleanly portion the workpieces or damage to the workpieces may occur. In this second position, the infeed conveyors 26 and 28 define predetermined first and second conveyor belt gaps 52 and 54 to match the position of the blade assembly 56 in the second, 45° position.

To set the infeed conveyors 26 and 28 in the second position, the adjustable limiting assembly includes a second gap-adjusting assembly 164 configured to stop the forward movement of the infeed conveyors 26 and 28 when they have reached the second position. In particular, the second gap-adjusting assembly 164 includes structure to stop the forward movement of the sliding bar 138 (and therefore the first and second infeed nose bars 38 and 40) when the infeed conveyors 26 and 28 have reached the second position.

In the depicted embodiment, the second gap-adjusting assembly 164 includes at least one adjustable forward-limiting stop, such as a forward-limiting fastener 166 positioned to engage and stop the forward movement of the sliding bar 138 as it is moved by the push-pull rod 130 toward the outfeed conveyors 30 and 32. The forward-limiting fasteners 166, which may be screws, bolts, etc., are threadably secured within a second transverse frame member 168 or other suitable structure. The second transverse frame member 168 is positioned between the sliding bar 138 and the nose bar plates 140 and 142, and a portion of each forward-limiting fastener 166, such as the threaded body of the fastener, extends from the second transverse frame member 168 toward the sliding bar 138 with the fastener axes substantially parallel to the longitudinal axis of the push-pull rod 130.

Each rearward-limiting fastener 166 is threaded within an opening in the second transverse frame member 168 until a selected length of the threaded body of the fastener 166 extends from the second transverse frame member 168 so as to engage and stop the forward movement of the sliding bar 138 (and therefore the first and second infeed nose bars 38 and 40) in the second position. When the first and second infeed nose bars 38 and 40 are in the second position, the first and second conveyor belt gaps 52 and 54 are also of a second size suitable to accommodate the blade assembly 56 in the second, 45° position.

The extended position of the forward-limiting fasteners 166 may be adjusted as needed to increase or decrease the size of the first and second conveyor belt gaps 52 and 54 in the second position. As noted above, the gaps must be precisely sized to accommodate the angle of the blade assembly 56. Thus, prior to full production use of the blade portioner assembly 20, the position of each of the forward-limiting fasteners 166 may be calibrated or fine-tuned with the blade assembly 56 in the second, 45° position to ensure that the first and second conveyor belt gaps 52 and 54 are appropriately sized. Accordingly, once the position of the forward-limiting fasteners 166 is fixed, the second gap-adjusting assembly 164 will automatically reduce the first and second conveyor belt gaps 52 and 54 to the second size when the blade assembly 56 is moved into the second, 45° position. Thus, the downtime required by an operator to change the size of the conveyor belt gaps 52 and 54 when the blade assembly is moved into the second, 45° position, along with any potential for human error, is eliminated.

It should be appreciated that other suitable adjustable rearward and forward limiting stops may instead be used instead of fasteners 154 and 166. For instance, the stops may instead be embodied as sensors that are set to stop the rearward or forward movement of the sliding bar 138 when it reaches a predetermined position. The sensors could be controlled by the processor of the blade portioning conveyor machine 16 or through other wired or wireless means. As another example, the sliding bar 138 (or the interior infeed nose bars 38 and 40) may be moved by electromechanical means controlled by the system processor or another controller. In such an embodiment, the first, infeed automatic conveyor gap adjustment assembly 106 need not be tied to the rotation of the blade assembly 56, but it may instead be operated and controlled independently to move the interior infeed nose bars 38 and 40 into the first or second position when the blade assembly 56 is moved into the corresponding first or second position. Thus, it should be appreciated that the embodiment disclosed and illustrated herein should not be interpreted as limiting the scope of the claimed subject matter, and any suitable configuration or combination of various assemblies and subassemblies may be used.

It can also be appreciated that when the extended position of the rearward and forward limiting fasteners 154 and 166 are adjusted, the stroke length of the push-pull rod 130 may not match the distance traveled by the sliding bar 138 to engage the fasteners 154 and 166, respectively. More specifically, the rearward and forward limiting fasteners 154 and 166 may be adjusted such that each fastener extends toward the sliding bar 138 as much as possible, defining a minimum distance between the ends of the fasteners 154 and 166. Likewise, the rearward and forward limiting fasteners 154 and 166 could be adjusted such that each fastener was moved away from the sliding bar 138 as much as possible, defining a maximum distance between the ends of the fasteners 154 and 166.

The stroke length of the push-pull rod 130, which is defined by the movement of the mechanical connection and movement assemblies between the first and second blade positions, need to be at least as long as the maximum distance between the fasteners 154 and 166. The stroke length of the push-pull rod 130 need to be at least as long as the maximum distance between the fasteners 154 and 166 to allow the sliding bar 138 to engage the rearward and forward limiting fasteners 154 and 166 in that maximum distance configuration. However, the stroke length of the push-pull rod 130 must also accommodate the minimum distance configuration. In other words, the sliding bar 138 must be able to stop when it engages the rearward and forward limiting fasteners 154 and 166, even if the distance between the rearward and forward limiting fasteners 154 and 166 is less than the stroke length of the push-pull rod 130 (such as in the minimum distance configuration).

As a specific example, if the extended threaded body portion of the rearward-limiting fasteners 154 and/or forward-limiting fasteners 166 was lengthened (i.e., the distal end of the threaded body portion was moved toward the sliding bar 138), the stroke length of the push-pull rod 130 would be further than the distance to be traveled by the sliding bar 138 between the rearward-limiting fasteners 154 and the forward-limiting fasteners 166. In other words, the sliding bar 138 would engage the fasteners 154 and 166 before the push-pull rod 130 completed its full stroke length caused by the rotating cam assembly 128.

To accommodate the adjustability in the fasteners 154 and 166 and the excess stroke length of the push-pull rod 130, the first and second gap adjusting assemblies 152 and 164 may include an adjustment accommodation assembly. The adjustment accommodation assembly may include any suitable structure for allowing the push-pull rod 130 to move the maximum travel distance (defined by the fasteners 154 and 166 when furthest apart) while still stopping the sliding bar 138 against the fasteners 154 and 166 when the actual distance between the fasteners 154 and 166 is less than the maximum travel distance.

Referring specifically to FIGS. 8-11, the adjustment accommodation assembly may include first and second biasing members, such as first and second compression springs 160 and 170 secured on the push-pull rod 130 and configured to engage and compress against the sliding bar 138 as the push-pull rod 130 moves back and forth. Stated another way, the push-pull rod 130 is connected to the sliding bar 138 through the first and second compression springs 160 and 170 to move the sliding bar 138 therewith.

Figure 9:
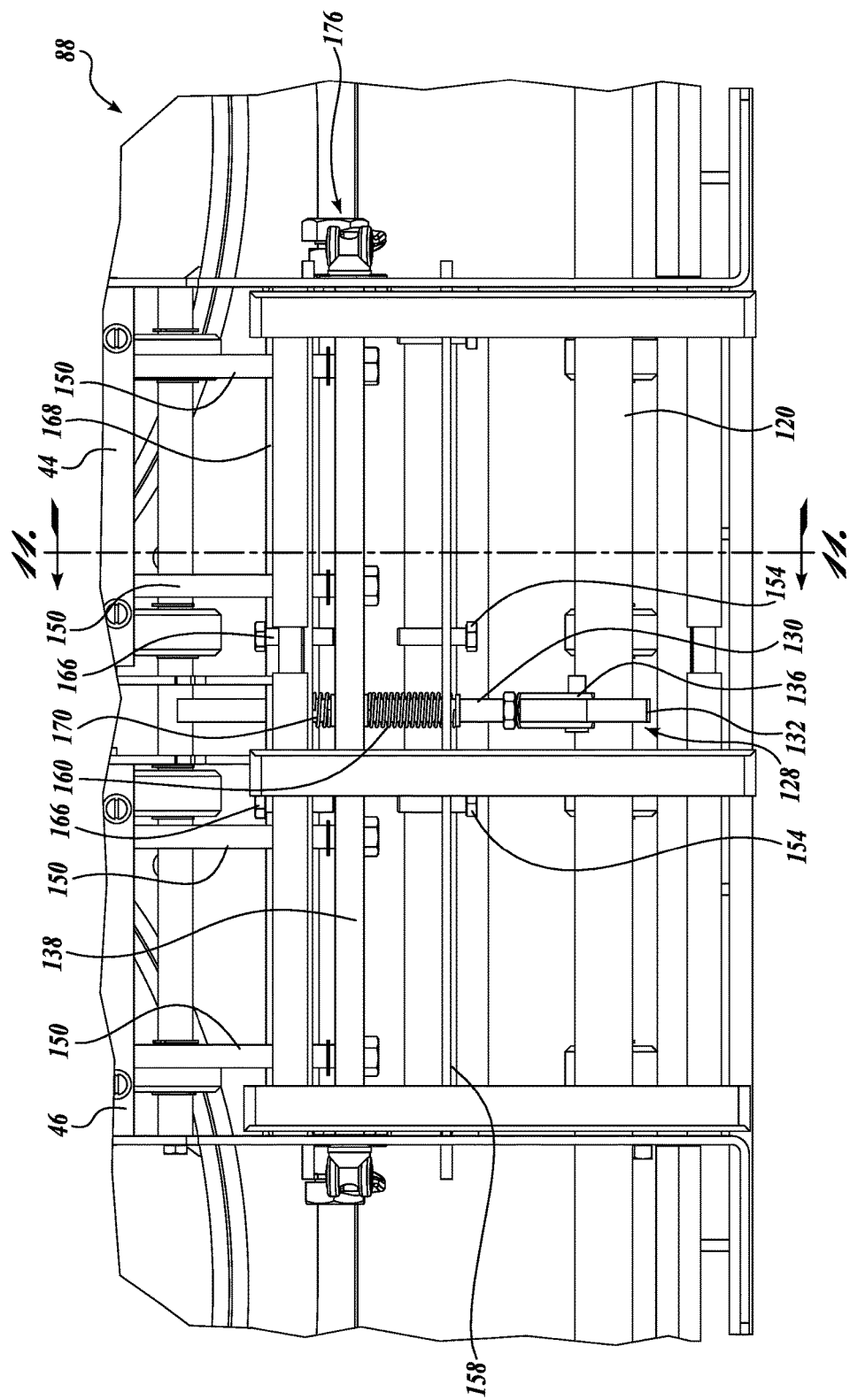
FIG. 9 is a zoomed in top view of a portion of the blade portioner assembly of FIG. 7.
Figure 11:
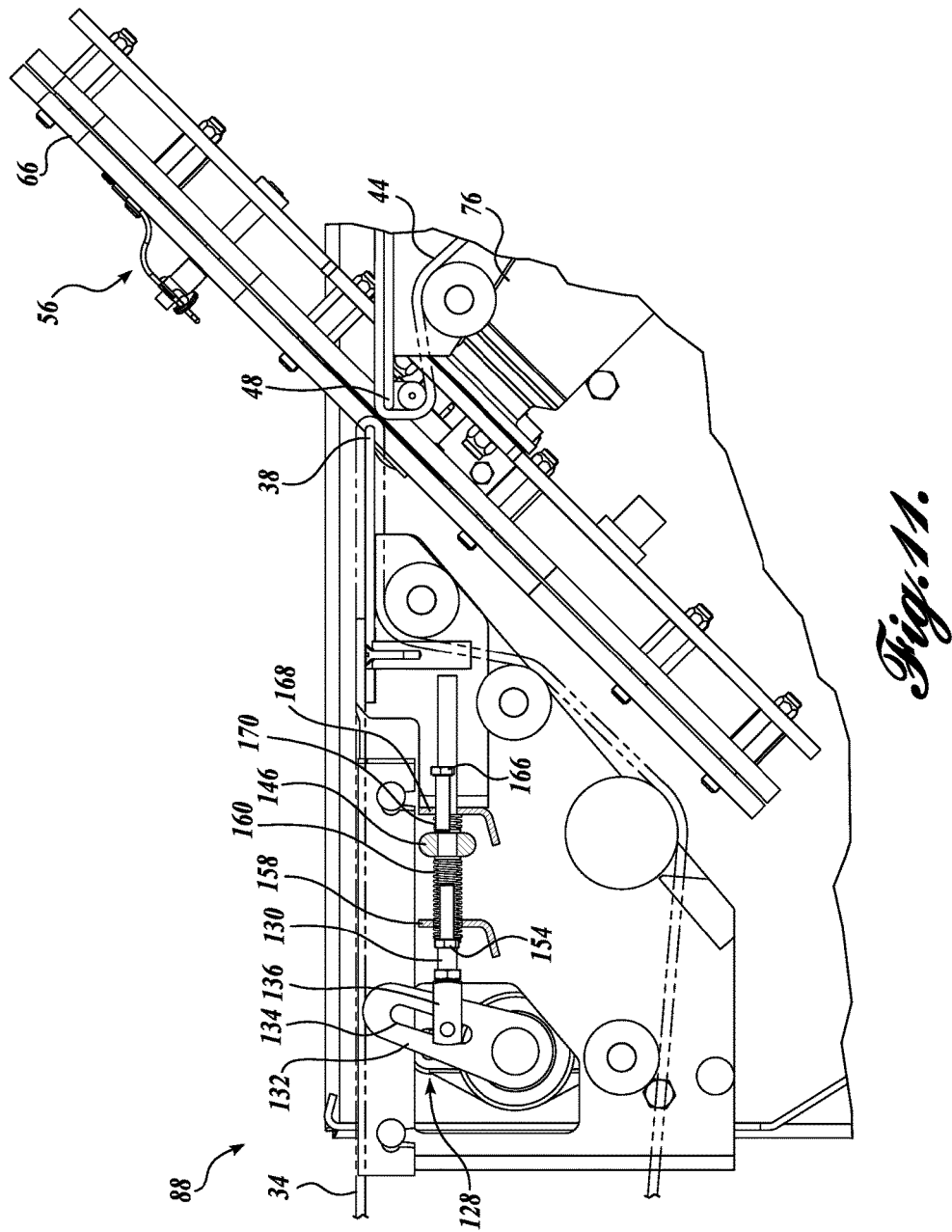
FIG. 11 is a cross-sectional view of the blade portioner assembly of FIG. 9, taken substantially across line 11-11.

Specifically with regard to the first compression spring 160, and a first end of the first compression spring 160 (nearest the first transverse frame member 158) is secured to the push-pull rod 130 and a second end of the first compression spring 160 (nearest the sliding bar 138) is free to move relative to the push-pull rod 130. In this manner, the first compression spring 160 compresses against the sliding bar 138 as the push-pull rod 130 moves toward the forward limiting fasteners 166, as shown in FIGS. 9 and 11. The compression of the first compression spring 160 against the sliding bar 138 moves the sliding bar 138 toward the forward limiting fasteners 166. The sliding bar 138 stops moving forwardly when it engages the forward limiting fasteners 166; however, the push-pull rod 130 can continue to travel along its path (completing the full stroke of the cam assembly 128) until the first compression spring 160 fully compresses.

Figure 8:
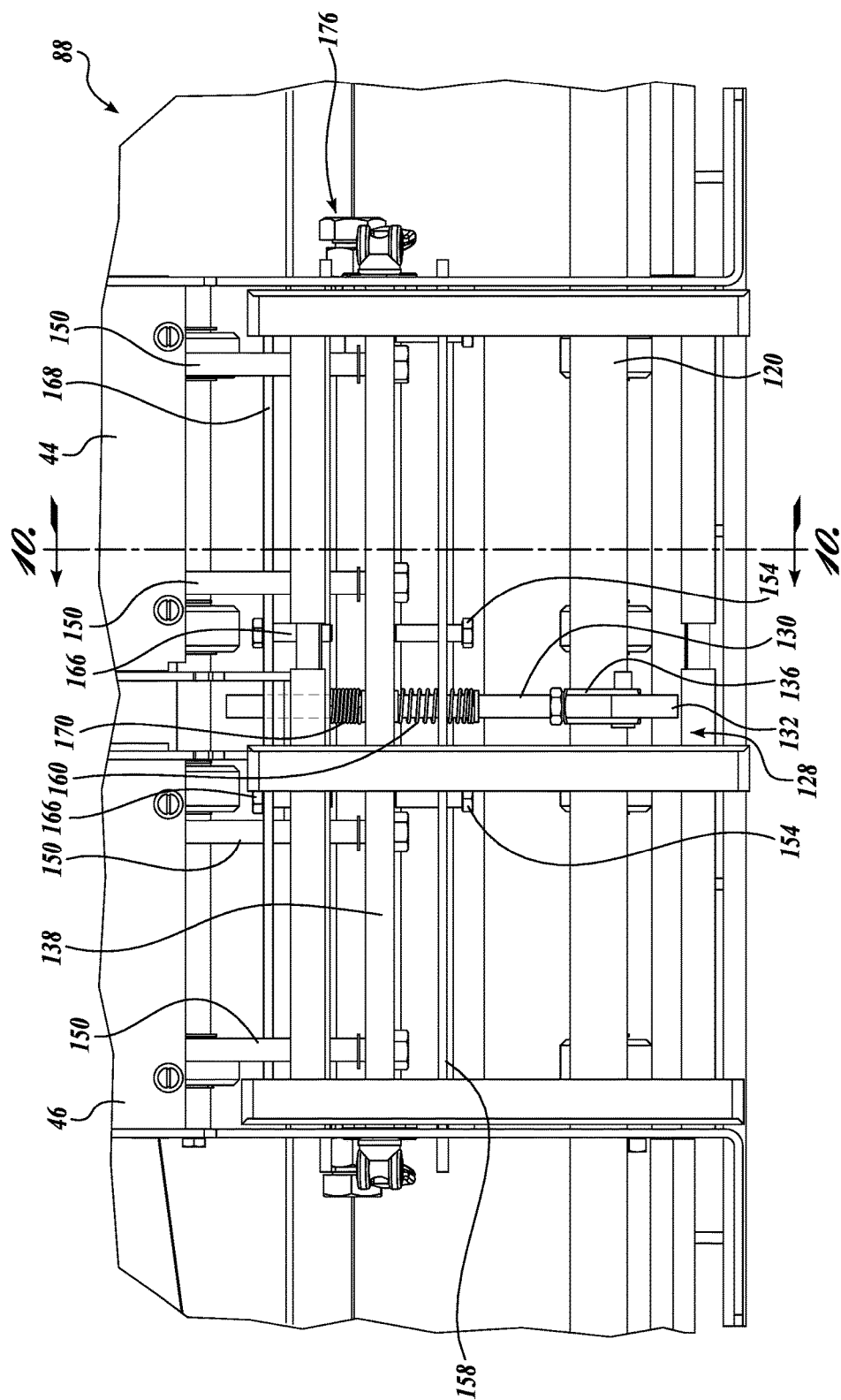
FIG. 8 is a zoomed in top view of a portion of the blade portioner assembly of FIG. 6.
Figure 10:
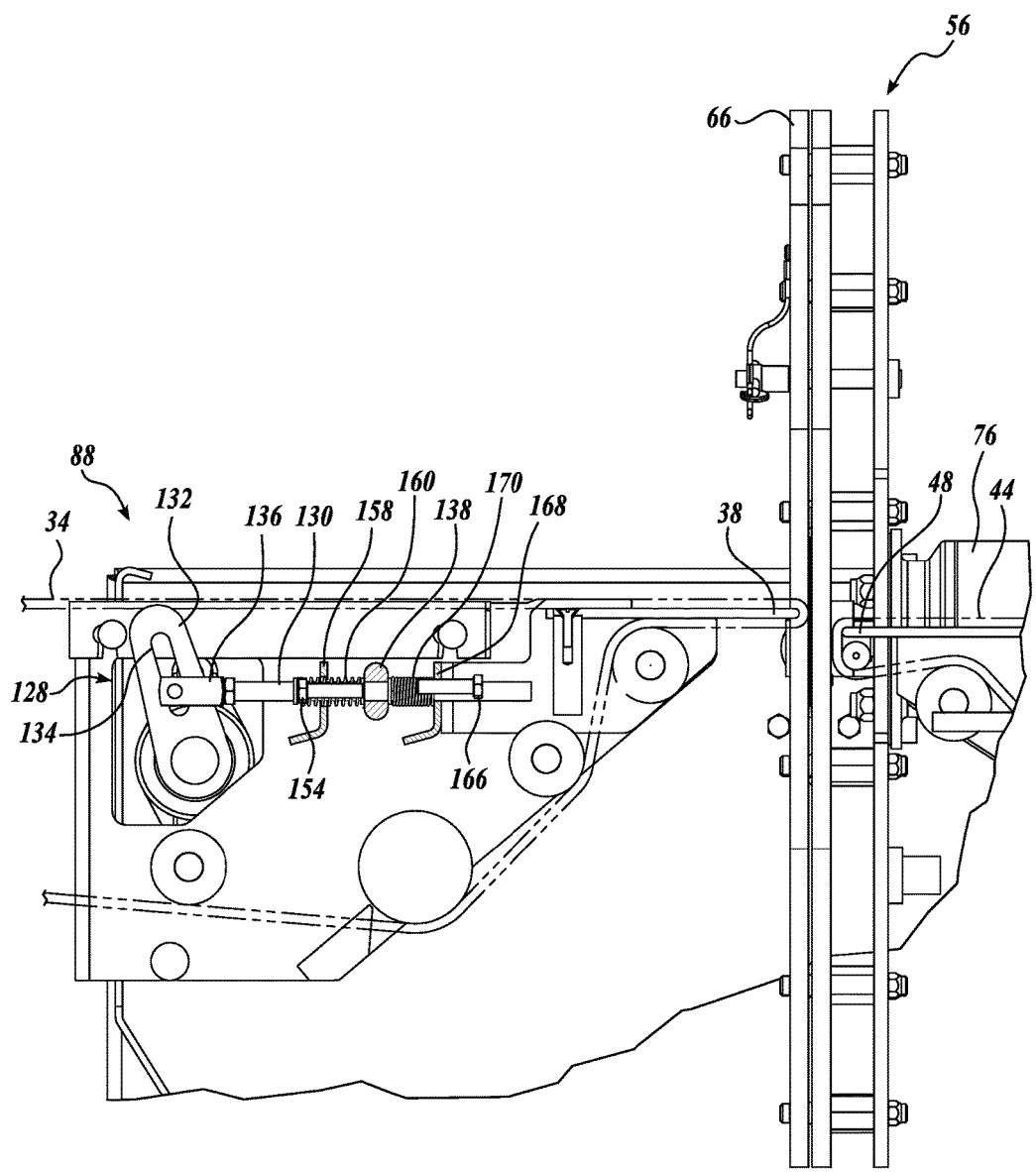
FIG. 10 is a cross-sectional view of the blade portioner assembly of FIG. 8, taken substantially across line 10-10.

With regard to the second compression spring 170, a first end of the second compression spring 170 (nearest the second transverse frame member 168) is secured to the push-pull rod 130 and a second end of the second compression spring 170 (nearest the sliding bar 138) is free to move relative to the push-pull rod 130. In this manner, the second compression spring 170 compresses against the sliding bar 138 as the push-pull rod 130 moves toward the rearward limiting fasteners 154, as shown in FIGS. 8 and 10. The compression of the second compression spring 170 against the sliding bar 138 moves the sliding bar 138 toward the rearward limiting fasteners 154. The sliding bar 138 stops moving rearwardly when it engages the rearward limiting fasteners 154; however, the push-pull rod 130 can continue to travel along its path (completing the full stroke of the cam assembly 128) until the second compression spring 170 fully compresses.

The first and second compression springs 160 and 170 are preferably pre-loaded (slightly compressed) at all times so that the mechanical connection to the cam assembly 132 remains stiff until the force applied by the driven shaft 120 is sufficient to overcome the pre-loaded force. In addition, the pre-loaded first and second compression springs 160 and 170 help bias the sliding bar 138 back toward the other of the first or second position to aid in manual movement of the infeed conveyors 26 and 28 between the first and second positions. It should be appreciated that other suitable biasing members may instead be used, such as another type of elastic spring, gas struts or the like.

In some instances, it may be desired to move the sliding bar 138 into the first or second position (or a position in between) without adjusting the blade assembly 56. In this regard, the automatic blade and conveyor gap adjustment assembly 88 may include a releasable sliding bar lock assembly 176 configured to move and secure the sliding bar 138 in at least one of the first and second positions.

Figure 4:
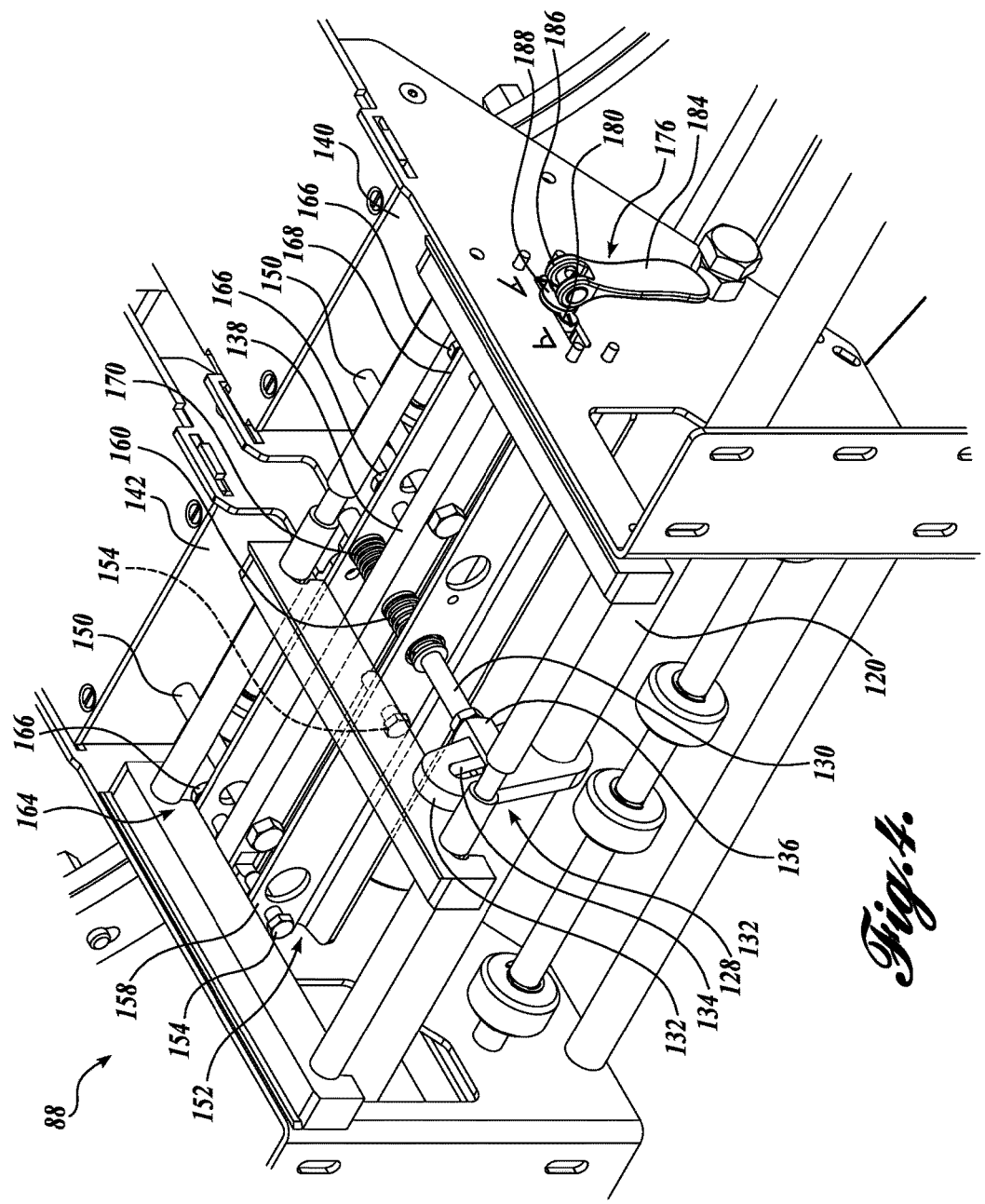
FIG. 4 is a zoomed in isometric view of a portion of the blade portioner assembly of FIG. 2.
Figure 5:
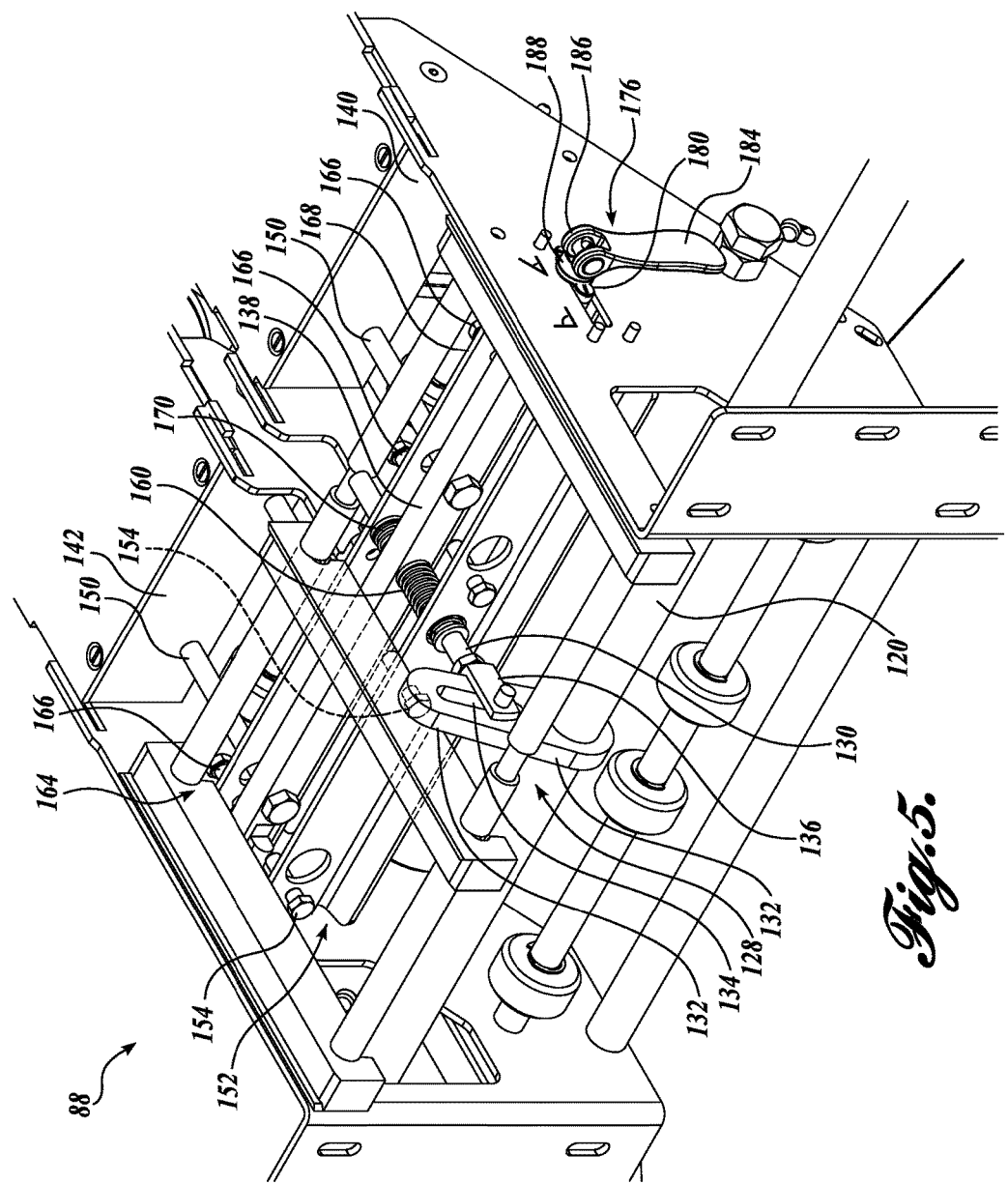
FIG. 5 is a zoomed in isometric view of a portion of the blade portioner assembly of FIG. 3.

Referring to FIGS. 4 and 5, the releasable sliding bar lock assembly 176 includes a cam clamp lever arm 184 pivotally secured at its proximal end to a pin (not labeled) that is connected to and extends from the end of the sliding bar 138, substantially along the longitudinal axis of the sliding bar 138 through a slot 180 in a portion of the machine housing. The cam clamp lever arm 184, as is well known in the art, includes a cam or clamping portion 186 at its proximal end that is engageable with an exterior portion of the machine housing when the lever arm 184 is pivoted into a second, clamped position (not shown). In this second, clamped position, the sliding bar 138 is fixed in position. When in a first, unclamped position, as shown in FIGS. 4 and 5, the sliding bar 138 may be moved along the length of the slot 180 between the first and second positions or any position therebetween. A clamp plate or washer 188 may be disposed between the clamping portion 186 and the exterior portion of the machine housing to provide a clamping surface at the opening of the slot 180. It should be appreciated that any other suitable releasable sliding bar lock assembly 176 configured to releasably secure and move the sliding bar 138 between at least the first and second positions may instead be used.

Although the illustrations depict an automatic blade and conveyor gap adjustment assembly 88 having only a first, infeed automatic conveyor gap adjustment subassembly 106, it should be appreciated that the automatic blade and conveyor gap adjustment assembly 88 may also include a second, outfeed automatic conveyor gap adjustment subassembly suitable for adjusting the size and/or position of the first and second conveyor belt gaps by moving the first and second outfeed nose bars 48 and 50 toward or away from the first and second infeed nose bars 38 and 40. Moreover, the second, outfeed automatic conveyor gap adjustment subassembly may instead be configured (or may be additionally configured) to move the first and second outfeed nose bars 48 and 50 up and down relative to the horizontal position of the first and second infeed nose bars 38 and 40. The second, outfeed automatic conveyor gap adjustment subassembly would be substantially identical in structure and operation to the first, infeed automatic conveyor gap adjustment subassembly 106; and therefore, it is not separately illustrated and described.

It should also be appreciated that in a side-by side conveyor system, as depicted, a blade assembly having first and second independently moveable and rotatable blades may be used. In such a configuration, the first blade may be positioned at, for example, 90° to a first conveyor lane, and the second blade may be positioned at, for example, 45° to a second conveyor lane. Each conveyor lane may include an independent automatic blade and conveyor gap adjustment assembly 88 for simultaneously adjusting the infeed to outfeed conveyor belt gap and the blade angle for that conveyor lane.

Figure 12:
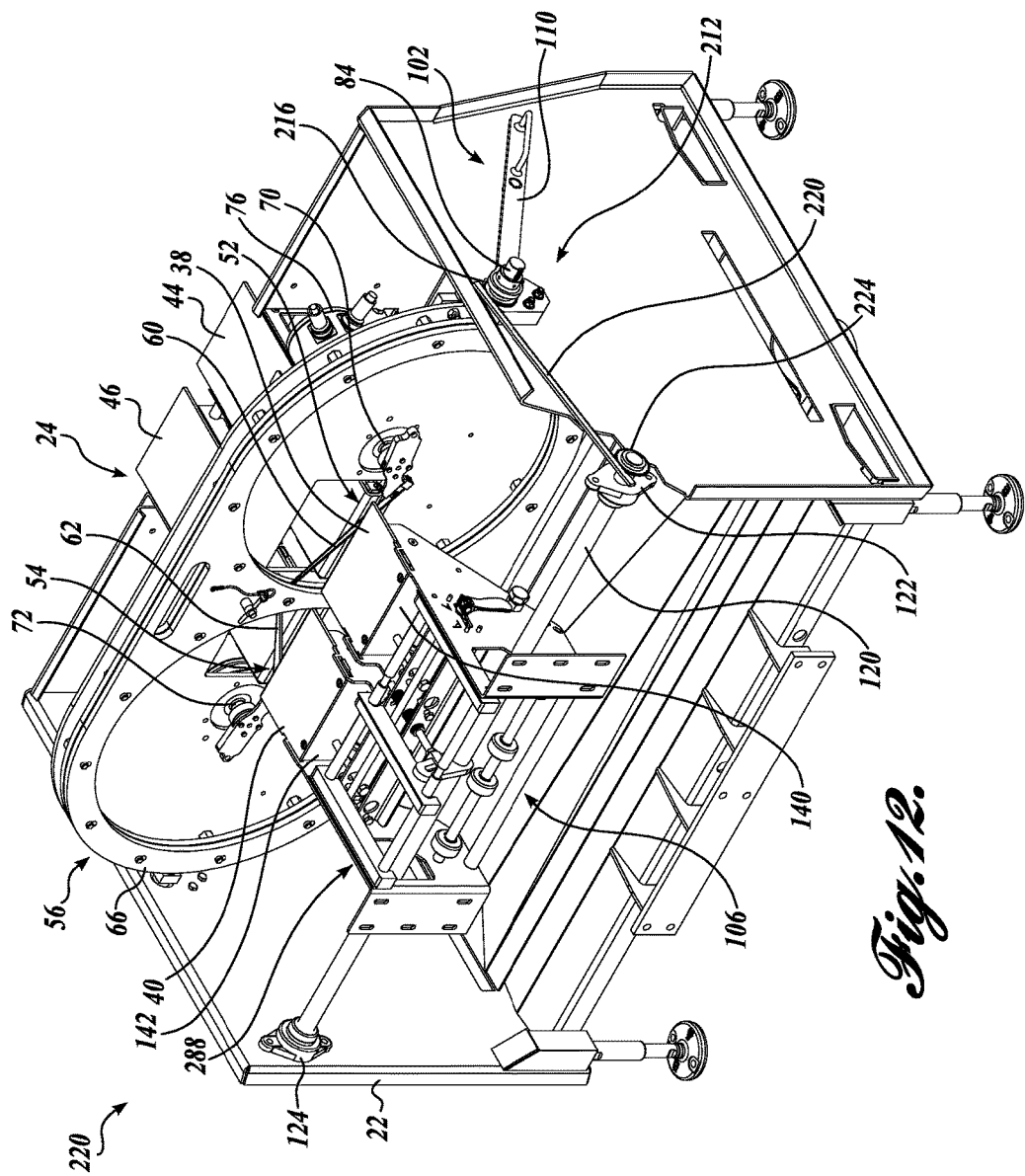
FIG. 12 is a blade portioner assembly formed in accordance with a first alternative exemplary embodiment of the present disclosure.
Figure 13:
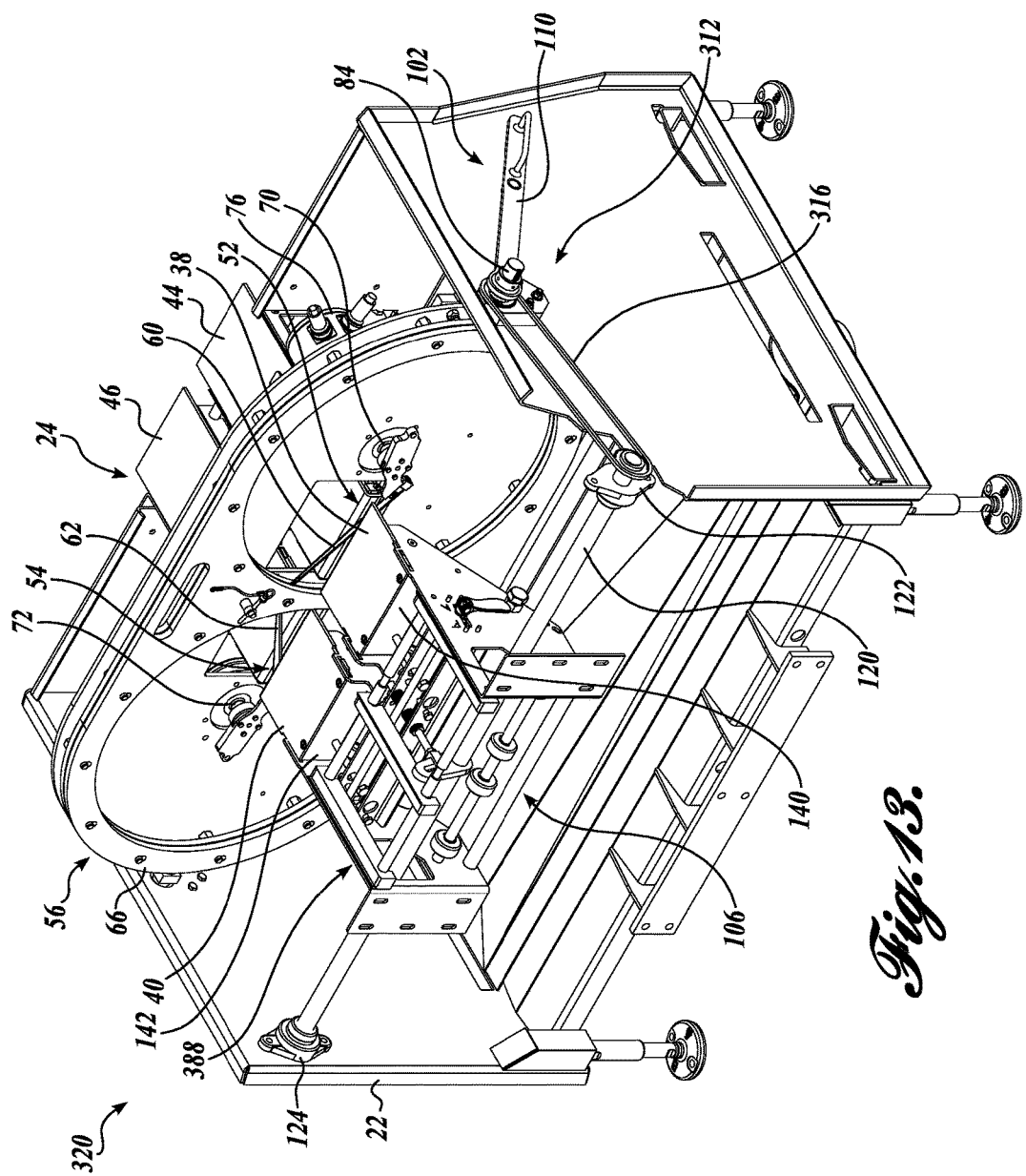
FIG. 13 is a blade portioner assembly formed in accordance with a second alternative exemplary embodiment of the present disclosure.
Figure 14:
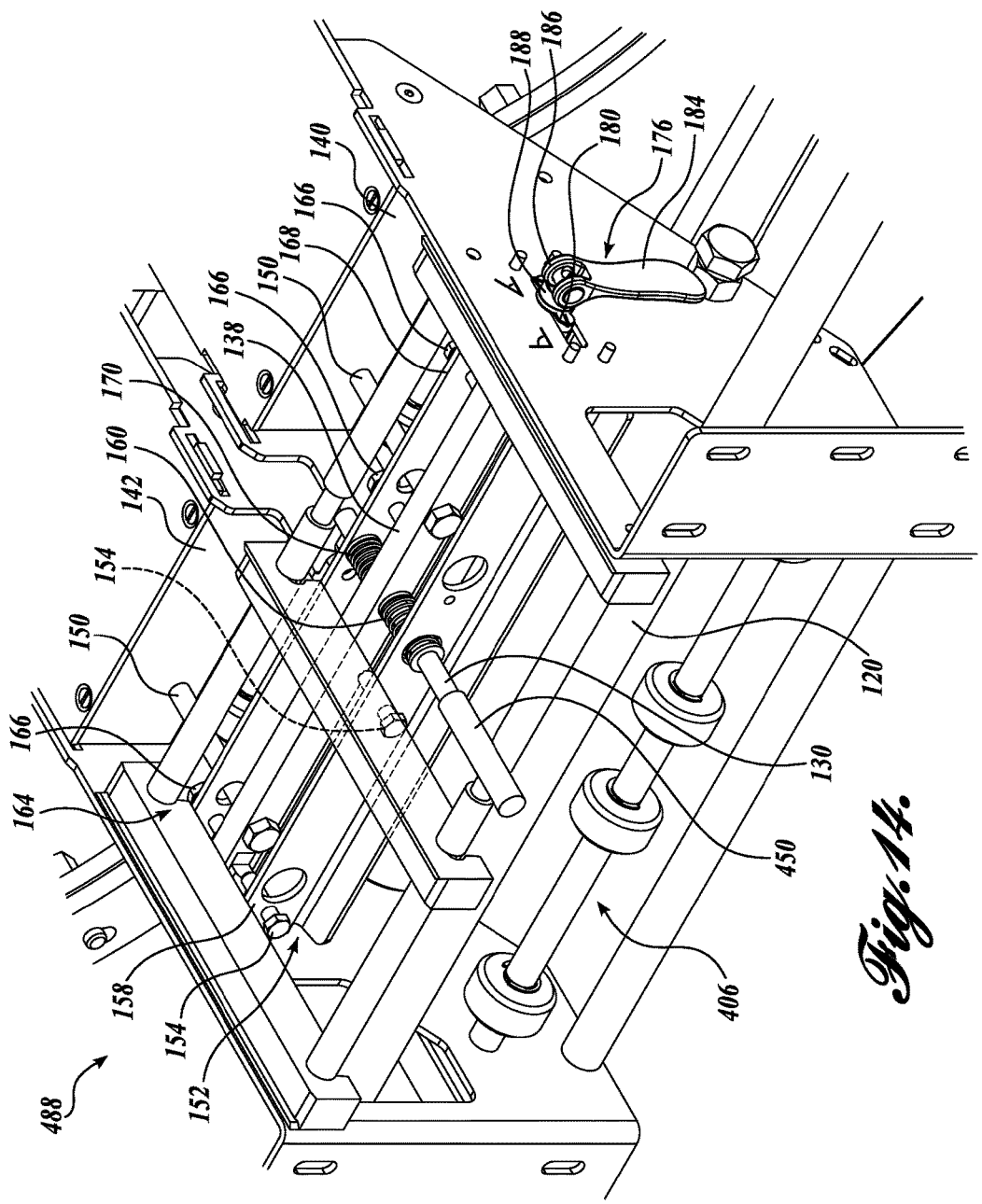
FIG. 14 is a blade portioner assembly formed in accordance with a third alternative exemplary embodiment of the present disclosure.

FIGS. 12-14 depict blade portioner assemblies 220, 320, and 420 having automatic blade and conveyor gap adjustment assemblies 288, 388, and 488, respectively, formed in accordance with alternative exemplary embodiments of the present disclosure. Numerous elements of the automatic blade and conveyor gap adjustment assemblies 88, 288, 388, and 488 are identical, and in this regard, identical parts are identified by the same reference numeral for ease of reference. Identical elements shown in FIGS. 12-14 will therefore not be separately described.

Referring to FIG. 12, the automatic blade and conveyor gap adjustment assembly 288 includes a mechanical connection assembly defined by a rack and pinion assembly 212 in lieu of a linkage assembly 112 (as shown in FIGS. 2, 3, 6 and 7). The rack and pinion assembly 212 is configured to operably couple the handle 110 to the first, infeed automatic conveyor gap adjustment subassembly 106. More specifically, the rack and pinion assembly 212 includes a first circular gear, or first pinion 216 fixedly secured on and moveable with the drive shaft 84. The first pinion 216 engages and moves a linear gear or rack 220, which engages and moves a second circular gear, or second pinion 224 fixedly secured on the end of a driven shaft 120.

The rotation of the drive shaft 84 causes the first pinion 216 to rotate, and the rotation of the first pinion 216 translates into linear movement of the rack 220 when the teeth of the first pinion 216 engage the rack 220 (not shown). Similarly, the linear movement of the rack 220 translates into rotation of the second pinion 224 when the teeth of the rack 220 engage the second pinion 224 (not shown). The rotation of the second pinion 224 rotates the driven shaft 120.

Referring to FIG. 13, the automatic blade and conveyor gap adjustment assembly 388 includes a mechanical connection assembly defined by a chain or belt assembly 312 in lieu of a linkage assembly 112 (as shown in FIGS. 2, 3, 6 and 7). The chain or belt assembly 312 is configured to operably couple the handle 110 to the first, infeed automatic conveyor gap adjustment subassembly 106. More specifically, the chain or belt assembly 312 includes a chain or belt 316 secured between and moveable with the drive shaft 84 and the driven shaft 120. Any suitable structure may be included on the drive shaft 84 and the driven shaft 120 to translate the rotation of the drive shaft 84 to the driven shaft 120 through the chain or belt 316. It should be appreciated that any other suitable configuration may instead be used to translate the rotation of the handle 110 to the driven shaft 120.

Referring to FIG. 14, the automatic blade and conveyor gap adjustment assembly 488 includes a first, infeed automatic conveyor gap adjustment subassembly 406 having a mechanical movement assembly that includes a pneumatic cylinder 450 in lieu of a cam assembly 128 (as shown in FIGS. 4 and 5). The pneumatic cylinder 450 may be operably coupled to the push-pull rod 130 for moving the push-pull rod 130 back and forth when actuated. The pneumatic cylinder 450 may be operably coupled to the driven shaft 120 for actuation, or it may instead be actuated by independent electronic or mechanical means to move simultaneously with the blade assembly 56.

It can be appreciated that the mechanical movement assembly may instead include any other mechanism suitable for moving the push-pull rod 130 back and forth for adjusting the first and second conveyor belt gaps 52 and 54. Furthermore, it can be appreciated that the exemplary embodiments of the automatic blade and conveyor gap adjustment assembly described and illustrated are generally configured to accomplish at least the following functions:

Adjusting the position of the first and second infeed conveyor noses between at least first and second positions to accommodate at least first and second positions of the blade assembly, wherein the conveyor assembly may be substantially horizontal and the blade assembly may be rotatable about a substantially horizontal axis to position the blade assembly in at least first and second angled positions relative to the substantially horizontal conveyor assembly;

Adjusting the at least first and second positions of the first and second infeed conveyor noses, for instance during a machine setup, wherein the distance between the first and second positions can be adjusted between a maximum distance and a minimum distance;

Appropriately positioning the first and second infeed conveyor noses relative to the blade assembly through a mechanical connection and movement assembly;

Allowing the travel distance of the mechanical connection and movement assembly to be at least as great as the maximum distance between the first and second positions of the first and second infeed conveyor noses; and Accommodating the maximum travel distance of the mechanical connection and movement assembly while moving the conveyor noses only between first and second positions, wherein the distance between the first and second positions of the conveyor noses is less than the maximum distance.

While illustrative embodiments have been illustrated and described, it will be appreciated that various changes can be made therein without departing from the spirit and scope of the invention. For instance, any of the illustrated embodiments may be modified in any suitable manner to carry out the above-listed functions.

The embodiments of the invention in which an exclusive property or privilege is claimed are defined as follows:

1. A blade and conveyor gap adjustment assembly for a blade portioning conveyor machine having a blade assembly and a conveyor assembly with an infeed conveyor and an outfeed conveyor, the blade and conveyor gap adjustment assembly comprising:
   (a) a blade adjustment assembly suitable for moving the blade assembly between at least first and second positions relative to the conveyor assembly; and
   (b) a first conveyor gap adjustment assembly configured to define a first gap between an interior nose of the infeed conveyor and an interior nose of the outfeed conveyor to correspond to the first position of the blade assembly and configured to define a second gap between the interior nose of the infeed conveyor and the interior nose of the outfeed conveyor to correspond to the second position of the blade assembly, wherein the first conveyor gap adjustment assembly includes a mechanical movement assembly configured to linearly move one of the interior nose of the infeed conveyor and the interior nose of the outfeed conveyor for defining the first and second gaps between the interior nose of the infeed conveyor and the interior nose of the outfeed conveyor, the mechanical movement assembly comprising:
      (i) a push-pull rod that is configured to linearly move in forward and rearward directions substantially along an axis of the conveyor assembly;
      (ii) a sliding bar moveable by the push-pull rod that is coupled to the one of the interior nose of the infeed conveyor and the interior nose of the outfeed conveyor; and
      (iii) an adjustable limiting assembly configured to limit the linear movement of the sliding bar when the push-pull rod is moved in the forward and rearward directions.

2. The assembly of claim 1, further comprising a mechanical connection assembly operably disposed between the blade adjustment assembly and the first conveyor gap adjustment assembly suitable for translating the movement of the blade assembly to the first conveyor gap adjustment assembly.

3. The assembly of claim 2, wherein the blade adjustment assembly comprises a drive shaft secured to a portion of the blade assembly that is rotatable to move the blade assembly between the at least first and second positions, wherein the drive shaft is operably coupled to a driven shaft of the first conveyor gap adjustment assembly through the mechanical connection assembly.

4. The assembly of claim 3, wherein the mechanical movement assembly includes a cam assembly moveable by the driven shaft.

5. The assembly of claim 4, wherein the cam assembly is operably coupled to the push-pull rod, and the cam assembly is configured to translate the rotation of the driven shaft to linear movement of the push-pull rod in forward and rearward directions.

6. The assembly of claim 5, wherein the sliding bar is engageable with a second stop when the push-pull rod is moved in the forward direction and a first stop when the push-pull rod is moved in the rearward direction.

7. The assembly of claim 6, wherein the sliding bar is in a first position when it engages the first stop, and wherein the sliding bar is in a second position when it engages the second stop.

8. The assembly of claim 7, wherein the first and second stops are adjustable in position to adjust the first and second positions of the sliding bar.

9. The assembly of claim 7, wherein the first and second stops are fasteners threadably received within a portion of the blade portioning conveyor machine.

10. The assembly of claim 7, wherein the first and second stops are sensors received within a portion of the blade portioning conveyor machine.

11. The assembly of claim 7, further comprising a first biasing member secured to the push-pull rod and engageable with the sliding bar to urge the sliding bar into the second position, and a second biasing member secured to the push-pull rod and engageable with the sliding bar to urge the sliding bar into the first position.

12. The assembly of claim 11, wherein the first biasing member compresses when the push-pull rod moves the sliding bar into the second position to allow the push-pull rod to continue moving forward after the sliding bar engages the second stop, and wherein the second biasing member compresses when the push-pull rod moves the sliding bar into the first position to allow the push-pull rod to continue moving rearward after the sliding bar engages the first stop.

13. The assembly of claim 2, wherein the mechanical movement assembly is configured to convert rotational movement of the blade assembly into linear movement of one of the interior nose of the infeed conveyor and the interior nose of the outfeed conveyor for defining the first and second gaps between the interior nose of the infeed conveyor and the interior nose of the outfeed conveyor.

14. The assembly of claim 2, wherein the adjustable limiting assembly includes first and second stops configured to limit the linear movement of the sliding bar between first and second positions, and wherein the first and second stops are adjustable to define a maximum distance between the first and second positions and a minimum distance between the first and second positions.

15. The assembly of claim 14, wherein the mechanical connection assembly and the mechanical movement assembly are configured to move at least the maximum distance to accommodate movement of the blade assembly between the first and second positions.

16. The assembly of claim 15, further comprising an adjustment accommodation assembly configured to allow the mechanical movement assembly to move at least the maximum distance while stopping movement of the one of the interior nose of the infeed conveyor and the interior nose of the outfeed conveyor at the first and second positions when the distance between the first and second positions is less than the maximum distance.

17. The assembly of claim 1, wherein the first conveyor gap adjustment assembly includes a releasable lock assembly configured to secure one of the interior nose of the infeed conveyor and the interior nose of the outfeed conveyor in at least one of first and second positions.

18. A blade and conveyor gap adjustment assembly for a blade portioning conveyor machine having a blade assembly and a conveyor assembly with an infeed conveyor and an outfeed conveyor, the blade and conveyor gap adjustment assembly comprising:
   (a) a blade adjustment assembly suitable for moving the blade assembly between at least first and second positions relative to the conveyor assembly; and
   (b) a conveyor gap adjustment assembly configured to define a first gap between an interior nose of the infeed conveyor and an interior nose of the outfeed conveyor to correspond to the first position of the blade assembly and configured to define a second gap between the interior nose of the infeed conveyor and the interior nose of the outfeed conveyor to correspond to the second position of the blade assembly, wherein the conveyor gap adjustment assembly comprises:
  (i) a mechanical movement assembly moveable in first and second directions, the mechanical movement assembly coupled to one of the interior nose of the infeed conveyor and the interior nose of the outfeed conveyor for defining the first and second gaps; and
  (ii) an adjustable limiting assembly configured to limit the movement of the mechanical movement assembly in both the first and second directions to selectively widen or narrow the first and second gaps.

19. The assembly of claim 18, wherein the mechanical movement assembly comprises an actuator configured to move the one of the interior nose of the infeed conveyor and the interior nose of the outfeed conveyor in the first and second directions, wherein the adjustable limiting assembly is configured to limit the movement of the one of the interior nose of the infeed conveyor and the interior nose of the outfeed conveyor when the actuator moves in the first and second directions.

20. The assembly of claim 18, wherein the actuator is defined by a push-pull rod that moves a sliding bar coupled to the one of the interior nose of the infeed conveyor and the interior nose of the outfeed conveyor, wherein the adjustable limiting assembly is configured to limit the movement of the sliding bar when the push-pull rod is moved in the first and second directions.

21. The assembly of claim 18, wherein the mechanical movement assembly comprises:
  (a) a push-pull rod that is configured to move in the first and second directions; and
  (b) a sliding bar moveable by the push-pull rod that is coupled to the one of the interior nose of the infeed conveyor and the interior nose of the outfeed conveyor;
  wherein the adjustable limiting assembly is configured to limit the movement of the sliding bar when the push-pull rod is moved in the first and second directions.

22. A conveyor gap adjustment assembly for a conveyor assembly having an infeed conveyor and an outfeed conveyor, the conveyor gap adjustment assembly configured to define a first gap between an interior nose of the infeed conveyor and an interior nose of the outfeed conveyor and configured to define a second gap between the interior nose of the infeed conveyor and the interior nose of the outfeed conveyor, the conveyor gap adjustment assembly comprising:
  an actuator configured to move one of the interior nose of the infeed conveyor and the interior nose of the outfeed conveyor in first and second directions, the actuator having a first stroke length in the first direction and a second stroke length in the second direction; and
  an adjustable limiting assembly configured to limit the movement of the one of the interior nose of the infeed conveyor and the interior nose of the outfeed conveyor in both the first and second directions when the actuator correspondingly moves in the first and second directions to selectively widen or narrow the first and second gaps, wherein in a first position, the adjustable limiting assembly is configured to substantially stop movement of the one of the interior nose of the infeed conveyor and the interior nose of the outfeed conveyor by the actuator before the actuator completes the first stroke length, and wherein in a second position, the adjustable limiting assembly is configured to allow movement of the one of the interior nose of the infeed conveyor and the interior nose of the outfeed conveyor by the actuator until the actuator completes the first stroke length.

23. The assembly of claim 22, further comprising a blade adjustment assembly suitable for moving a blade assembly between at least first and second positions relative to the conveyor assembly, wherein the first gap corresponds to the first position of the blade assembly and the second gap corresponds to the second position of the blade assembly.

24. The assembly of claim 22, wherein the actuator is defined by a push-pull rod that moves a sliding bar coupled to the one of the interior nose of the infeed conveyor and the interior nose of the outfeed conveyor, wherein the adjustable limiting assembly is configured to limit the movement of the sliding bar when the push-pull rod is moved in the first and second directions.

25. A conveyor gap adjustment assembly for a conveyor assembly having an infeed conveyor and an outfeed conveyor, the conveyor gap adjustment assembly configured to define a first gap between an interior nose of the infeed conveyor and an interior nose of the outfeed conveyor and configured to define a second gap between the interior nose of the infeed conveyor and the interior nose of the outfeed conveyor, the conveyor gap adjustment assembly comprising:
  (a) a mechanical movement assembly moveable in first and second directions, the mechanical movement assembly coupled to one of the interior nose of the infeed conveyor and the interior nose of the outfeed conveyor for defining the first and second gaps, wherein the mechanical movement assembly comprises:
    (i) a push-pull rod that is configured to move in the first and second directions, the push-pull rod having a first stroke length in the first direction and a second stroke length in the second direction; and
    (ii) a sliding bar moveable by the push-pull rod that is coupled to the one of the interior nose of the infeed conveyor and the interior nose of the outfeed conveyor; and
  (b) an adjustable limiting assembly configured to limit the movement of the sliding bar when the push-pull rod is moved in the first and second directions, wherein in a first position, the adjustable limiting assembly is configured to substantially stop movement of the sliding bar before the push-pull rod completes the first stroke length, and wherein in a second position, the adjustable limiting assembly is configured to allow movement of the sliding bar until the push-pull rod completes the first stroke length.

* * * * *